Jan. 10, 1967   J. R. RADEK   3,297,374
MERCHANDISE DISPLAY CABINET
Filed Jan. 2, 1964   18 Sheets-Sheet 1
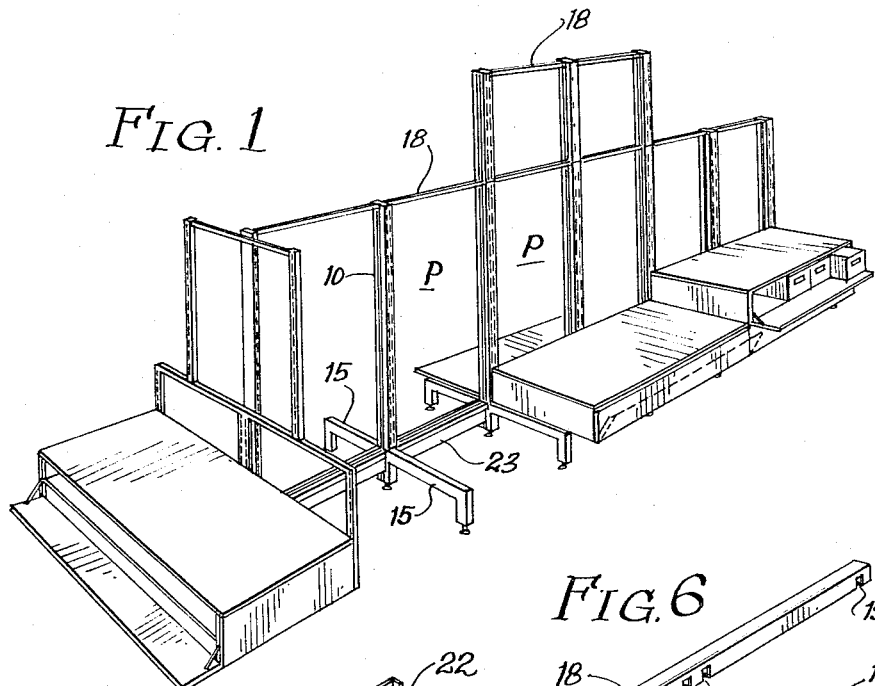
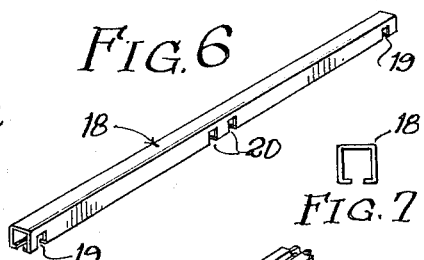
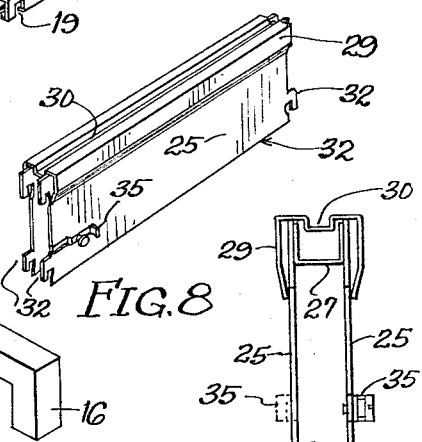
INVENTOR.
John R. Radek
BY
Frank H. Marks
Nathan H. Krauss
Att'ys

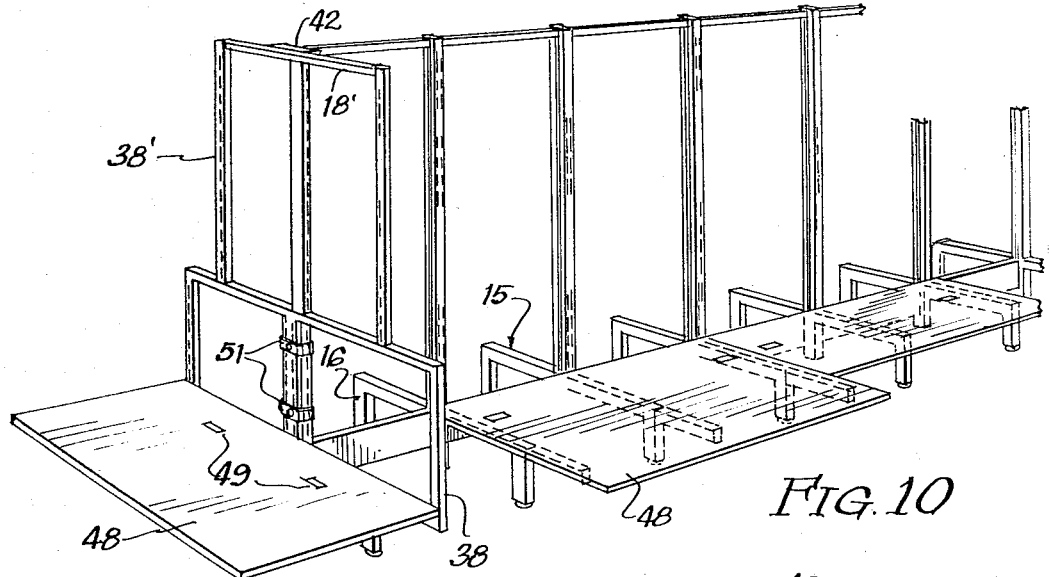
FIG. 10
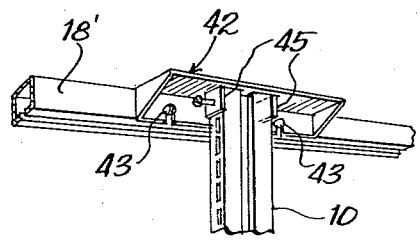
FIG. 12
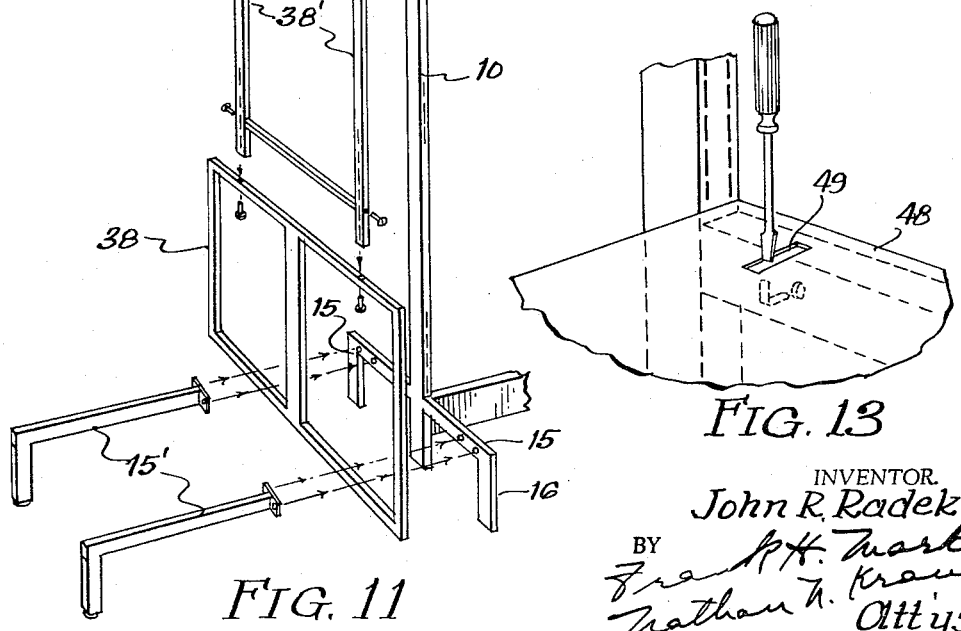
FIG. 11
FIG. 13
INVENTOR.
John R. Radek
BY
Attys INVENTOR.
John R. Radek
BY Frank H. Marks
Nathan K. Kraus
Att'ys Jan. 10, 1967  J. R. RADEK  3,297,374
MERCHANDISE DISPLAY CABINET
Filed Jan. 2, 1964  18 Sheets-Sheet 4

INVENTOR.
John R. Radek

Jan. 10, 1967  J. R. RADEK  3,297,374
MERCHANDISE DISPLAY CABINET
Filed Jan. 2, 1964  18 Sheets-Sheet 6

INVENTOR.
John R. Radek
BY Frank H. Marks
Nathan A. Kraus,
Att'ys

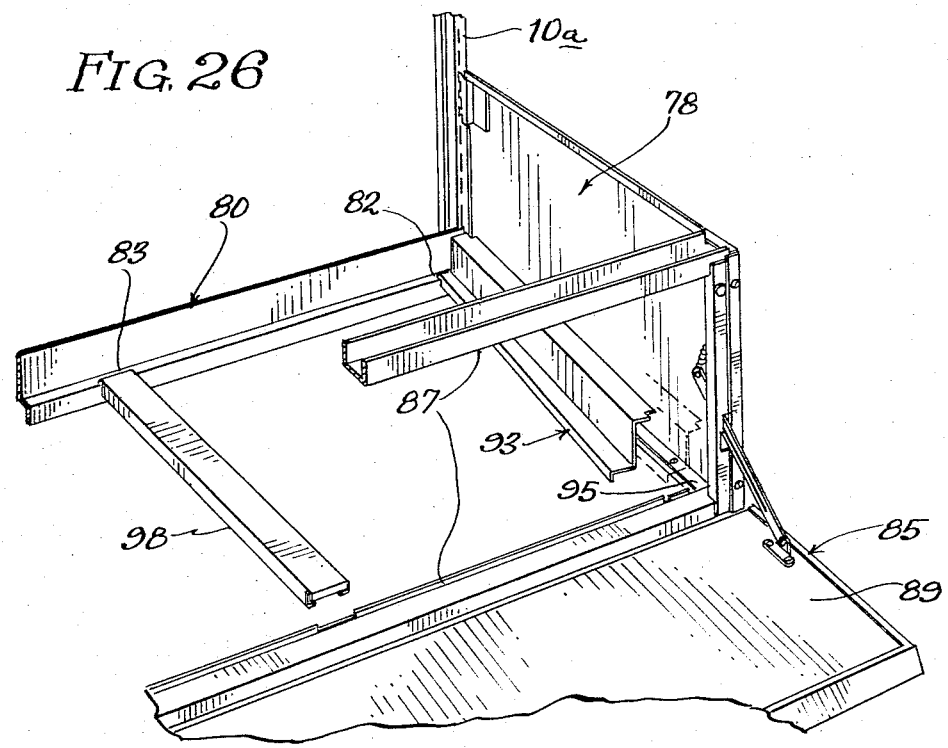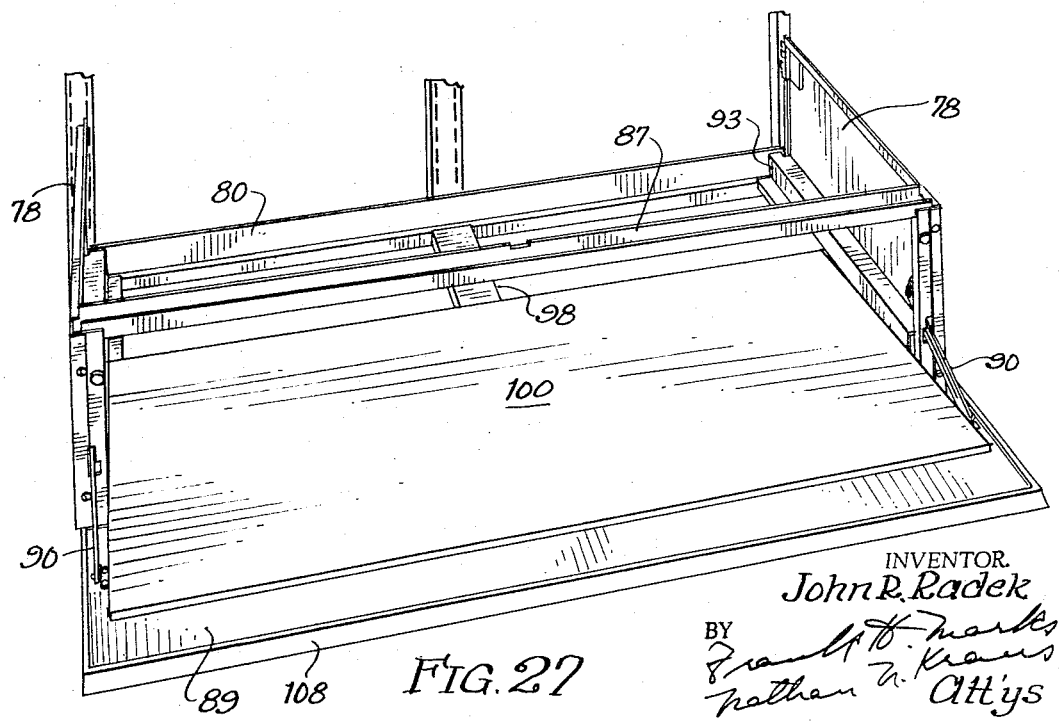

Jan. 10, 1967   J. R. RADEK   3,297,374
MERCHANDISE DISPLAY CABINET
Filed Jan. 2, 1964   18 Sheets-Sheet 8

INVENTOR.
John R. Radek
BY
Attys

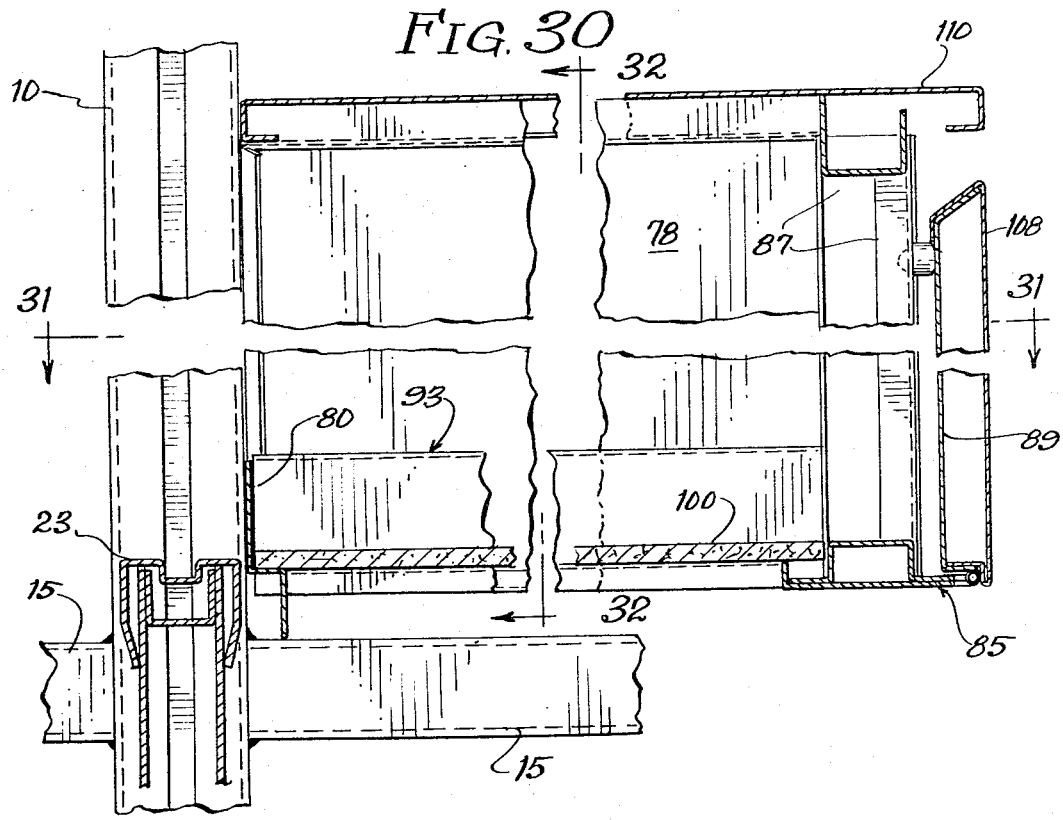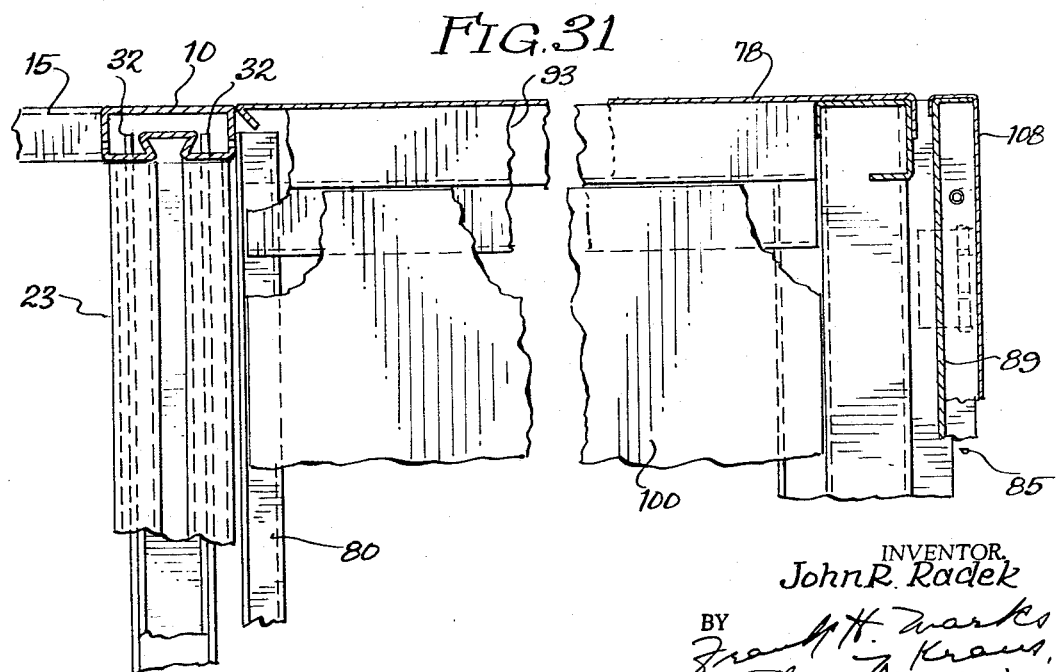

Jan. 10, 1967  J. R. RADEK  3,297,374

MERCHANDISE DISPLAY CABINET

Filed Jan. 2, 1964  18 Sheets-Sheet 10

INVENTOR.
John R. Radek
BY
Att'ys

Jan. 10, 1967  J. R. RADEK  3,297,374
MERCHANDISE DISPLAY CABINET
Filed Jan. 2, 1964  18 Sheets-Sheet 11
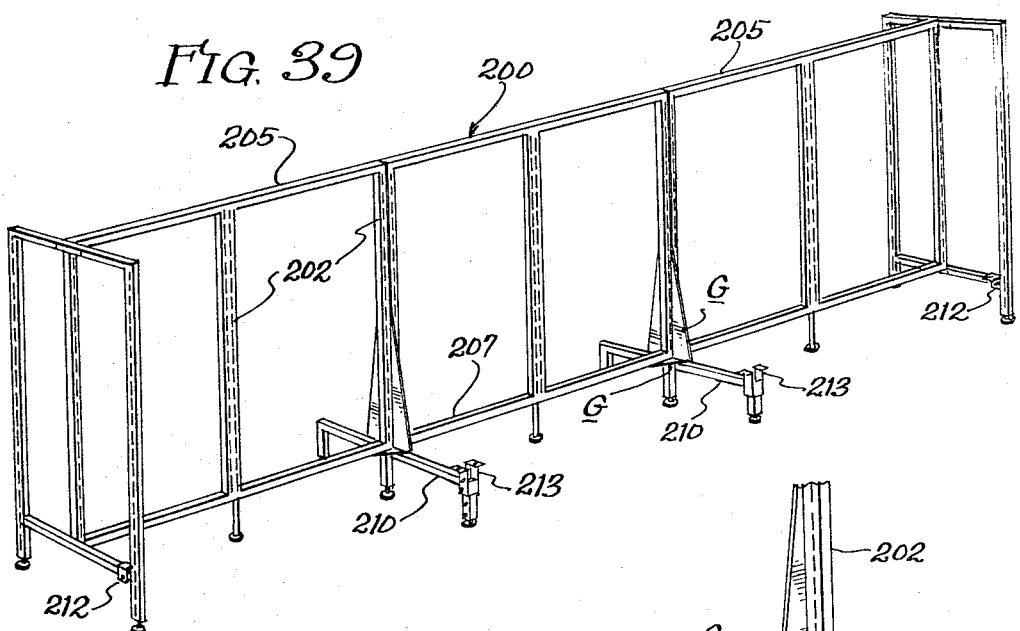
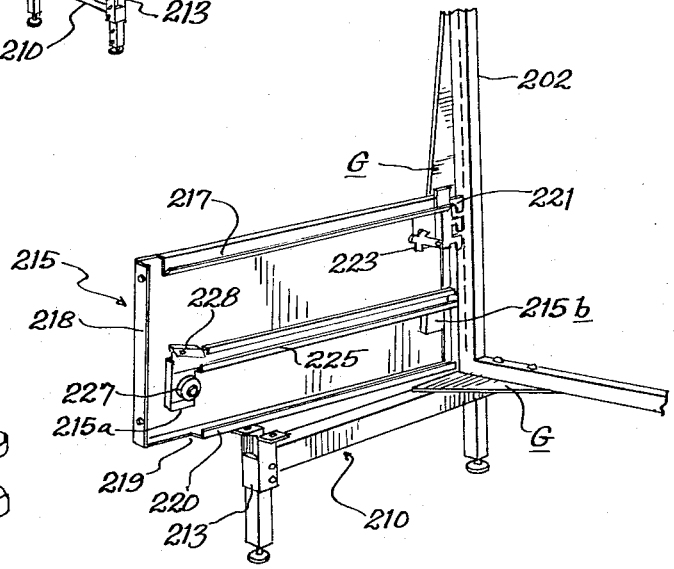
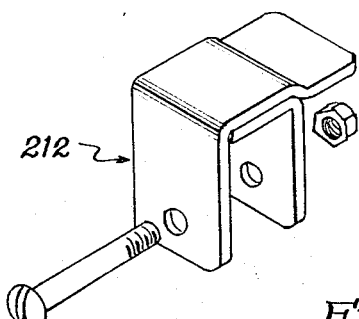
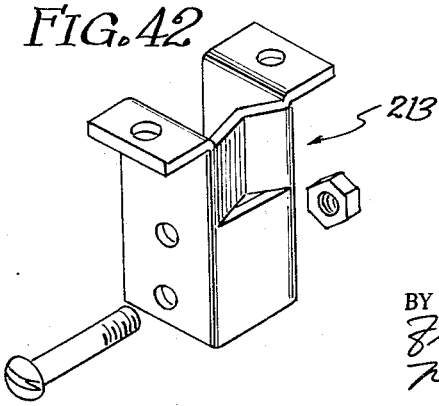
INVENTOR.
John R. Radek
BY
Frank H. Marks
Nathan A. Kraus
Att'ys

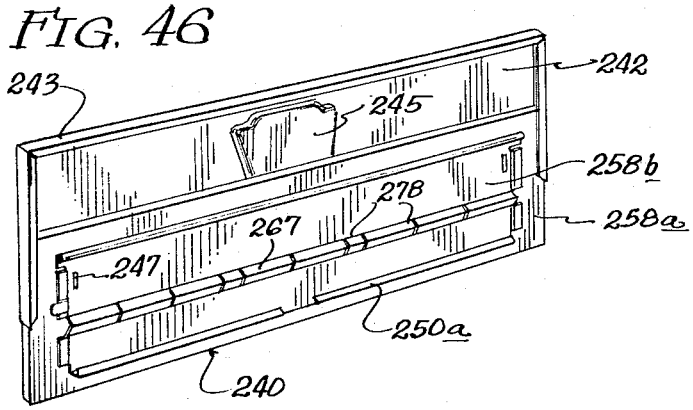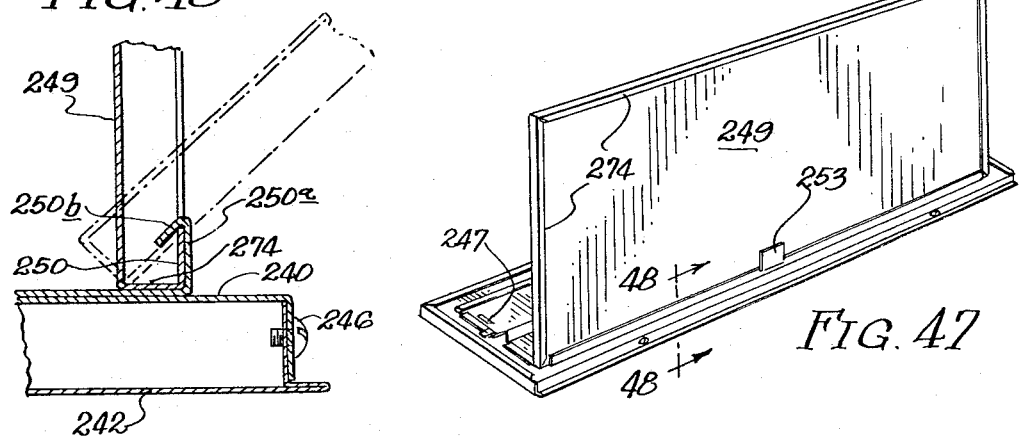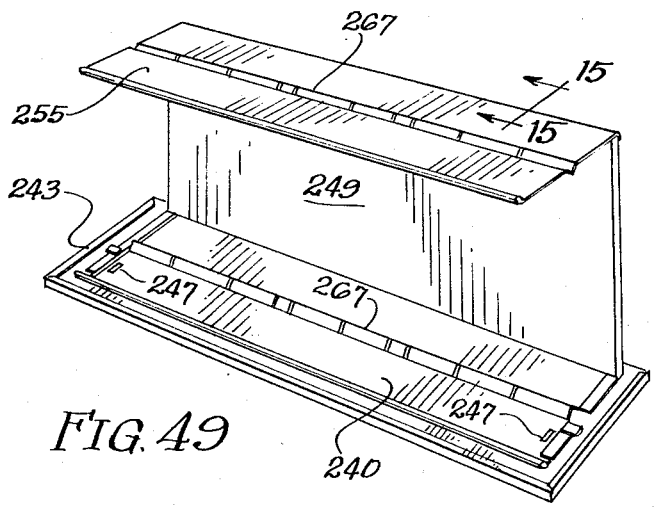

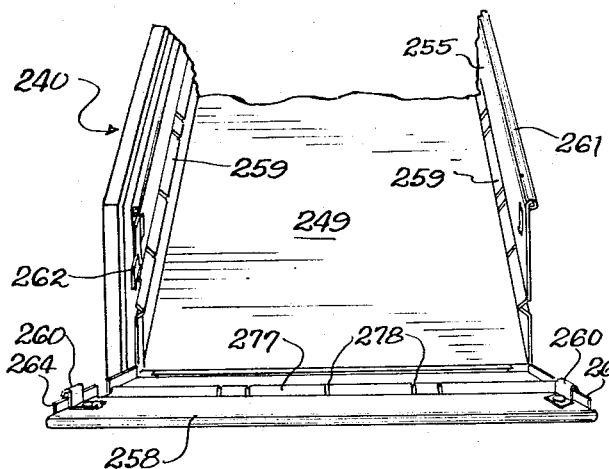
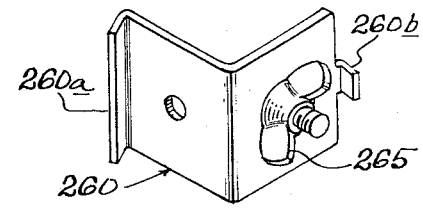
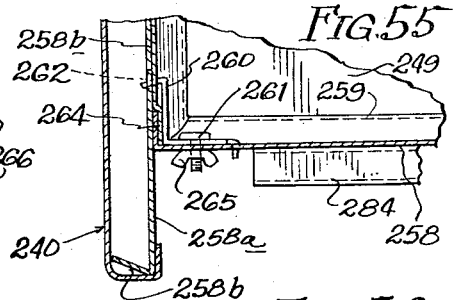
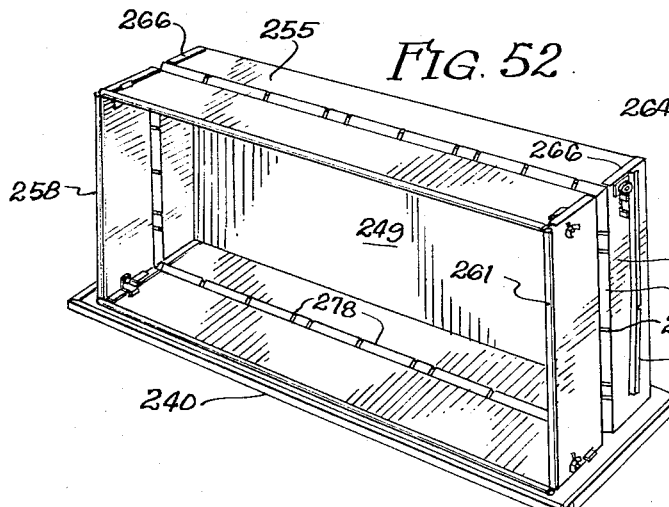
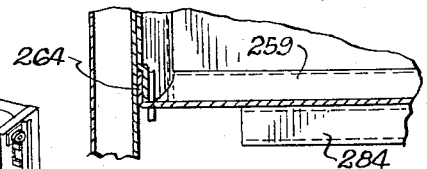
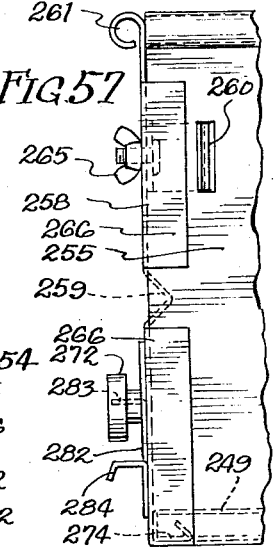
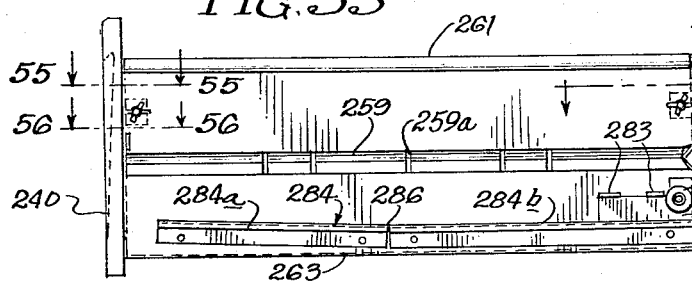
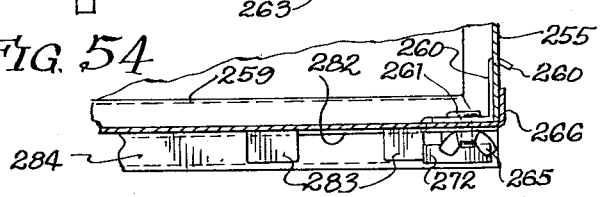

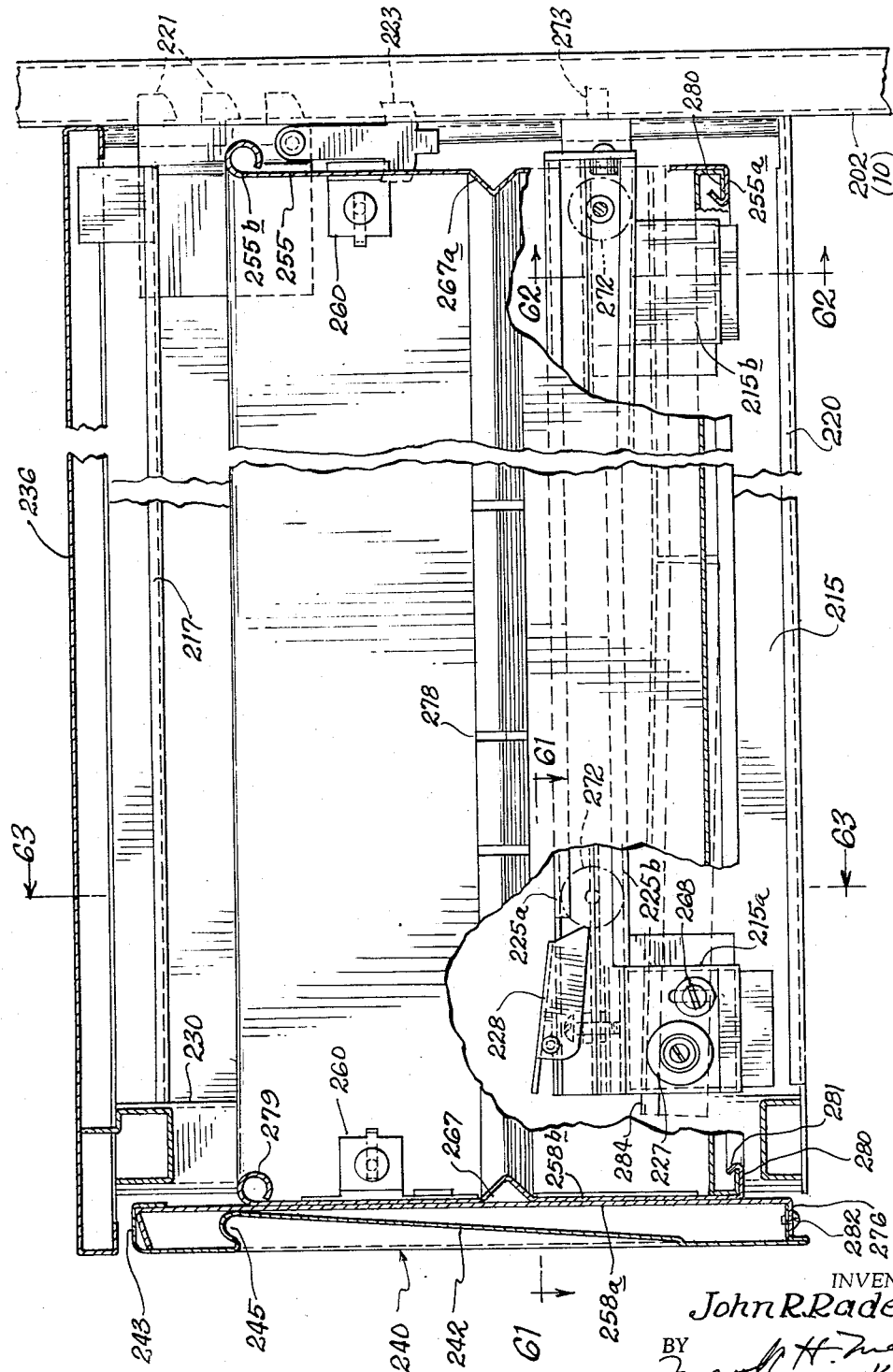

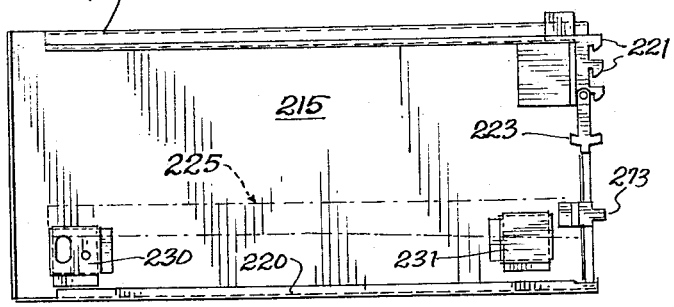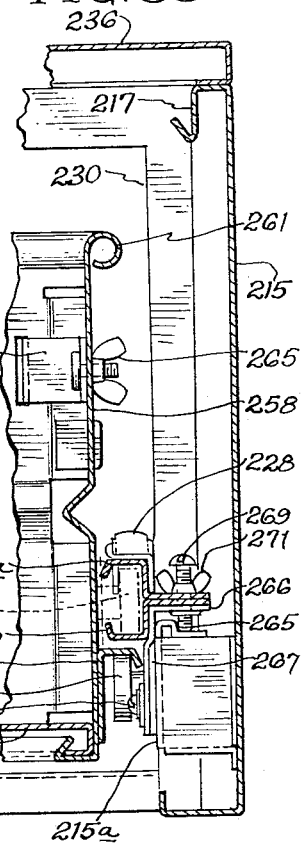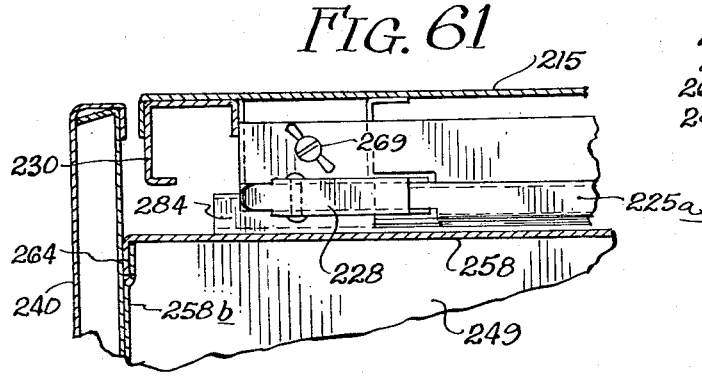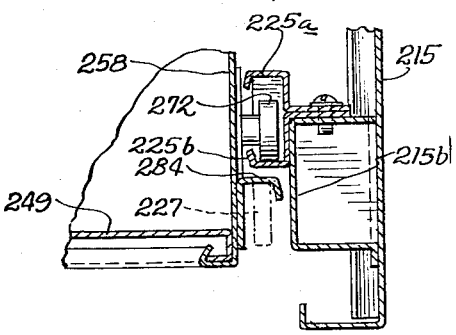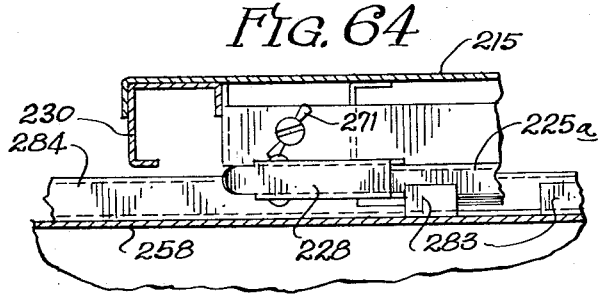

Jan. 10, 1967 J. R. RADEK 3,297,374
MERCHANDISE DISPLAY CABINET
Filed Jan. 2, 1964 18 Sheets-Sheet 18
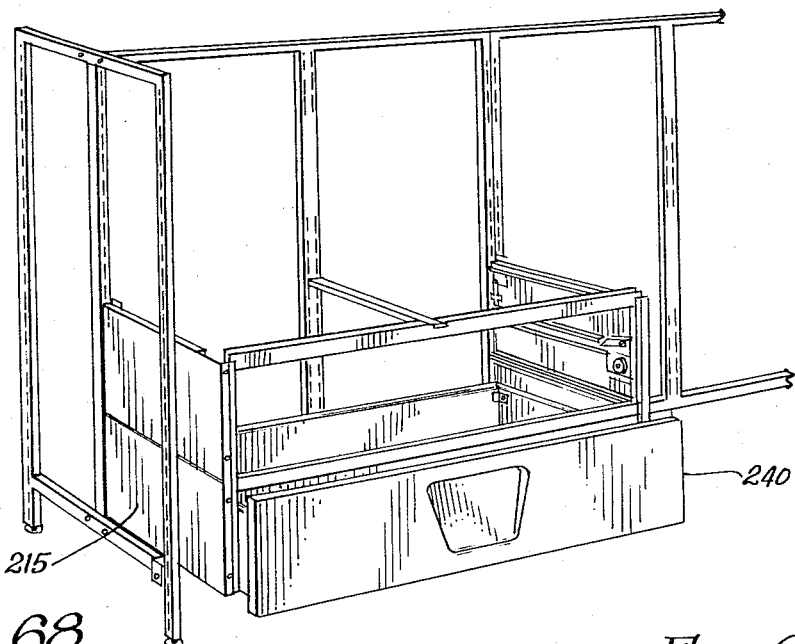
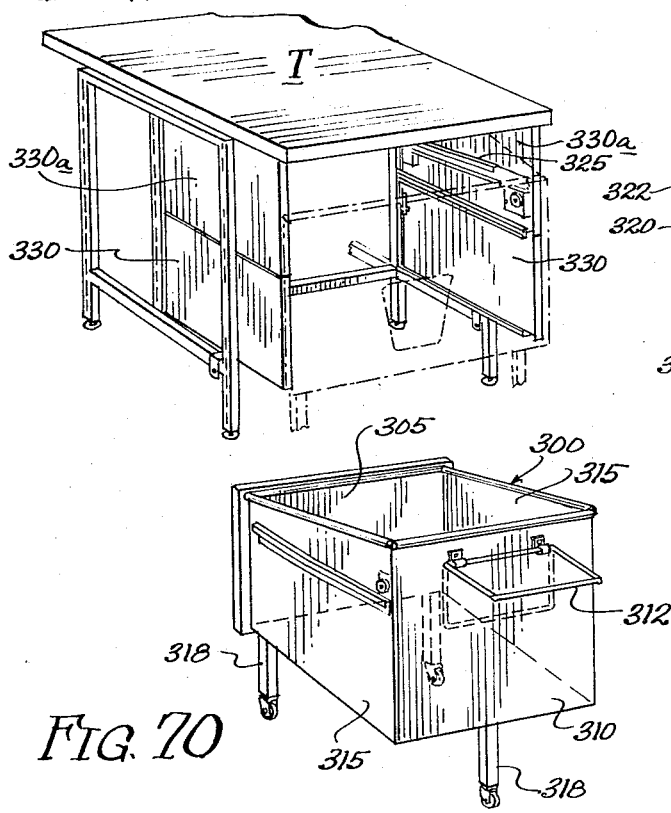
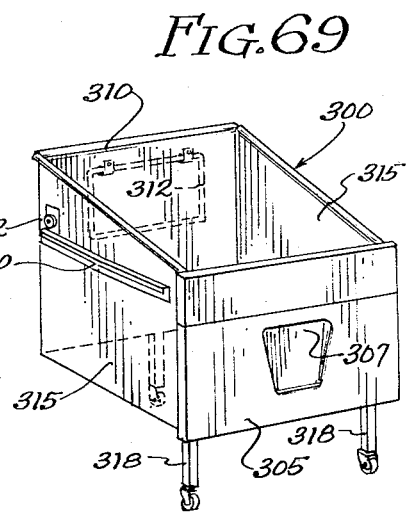
INVENTOR.
John R. Radek
BY
Frank H. Marks
Nathan N. Kraus,
Att'ys United States Patent Office 3,297,374
Patented Jan. 10, 1967

3,297,374
MERCHANDISE DISPLAY CABINET
John R. Radek, Hinsdale, Ill., assignor to Ready Metal
Mfg. Co., Chicago, Ill., a corporation of Illinois
Filed Jan. 2, 1964, Ser. No. 335,329
11 Claims. (Cl. 312—108)

This application is in part a continuation of my copending application S.N. 273,119, filed April 15, 1963, and now abandoned.

My invention relates to cabinets intended primarily for storage and the display of merchandise in a retail store, such as a department store or the like.

A particular object of my invention is to provide a cabinet of the type referred to which may be fabricated in quantity by mass production methods, preferably out of parts formed of sheet metal, molded plastic, or the like and supported by frame elements produced from more-or-less standard shapes.

A further and major object of my invention is to provide a cabinet of the type referred to which will have a high degree of versatliity. It is contemplated by my invention that the frame elements and other parts may be supplied to the user in knockdown condition, making for convenient and inexpensive transportation and storage, and may be employed by the user to construct a wide variety of cabinets of different types and capacities; for example, by varying the arrangement of the components, one may assemble them variously to provide bins, compartments, tables, etc. of various sizes and capacities.

Still another object of my invention is to provide an arrangement of the type referred to which is capable of extension or multiplication to any desired limit as to the number and kind of bins, compartments, tables, etc. Thus, a retailer may equip his shop by means of my invention so as to provide cabinets, display units, etc., extending along an entire side of a wall, the frame elements, etc., being so designed as to be interfitting, so that, when multiplied and combined with generally similar adjacent units, the entire combination will provide a unit assembly having not only a high degree of utility but also a pleasing appearance, thus adding markedly to the visual attractiveness of the store furnishings.

Still another object is to provide a knockdown cabinet of the type referred to having a readily detachable hinged access door which may be readily detached when desired to provide selectively an open-shelf unit or closed cabinet.

Another object is to provide a knockdown drawer especially suitable for cabinets embodying my invention.

Still another object is to provide, in cabinets of the type referred to, standard shelves which may be used alternatively in open or closed cabinets.

Still another object is to provide knockdown cabinets of the type referred to which may be erected alternatively against a wall or remote from a wall, the framing being so designed that cabinets may be erected on opposite sides of a median skeleton. Obviously, such an arrangement tends toward economy of parts and reduction of costs, inasmuch as the cabinets can be substantially duplicated, extending in opposite directions from a median skeleton framing without duplication of the frame. Such an arrangement is referred to herein as a *tandem* unit.

An important advantage inherent in my invention is that during a slack season, when inventories are reduced, it is possible for a merchant to take down and store in a minimum of space, as in a store room, that portion of his cabinetry as is not immediately required for the housing and display of merchandise, thus yielding floor space for other purposes.

Another object is to provide improved knock-down drawer construction adapted, in knock-down condition, to occupy a minimum of space, thus making for convenient shipment.

Various other objects and advantages will become apparent as the description proceeds.

Referring now to the drawings forming a part of this specification and illustrating certain preferred embodiments of my invention, FIG. 1 is a perspective view showing a tandem frame structure with "drop front" cabinets and promotional display mounted thereon in accordance with my invention;

FIG. 2 is a fragmentary perspective view of an end frame structure embodied in the assembly of FIG. 1;

FIG. 3 is a similar view of an intermediate frame structure embodied in FIG. 1;

FIG. 4 is a sectional view taken substantially along line 4—4 of FIG. 2;

FIG. 5 is a sectional view taken substantially along line 5—5 of FIG. 3;

FIG. 6 is a perspective view of a top stretcher bar as an element of the skeleton frame seen in FIG. 1;

FIG. 7 is an end elevational view of the bar shown in FIG. 6;

FIG. 8 is a perspective view of a base beam constituting an element of the frame shown in FIG. 1;

FIG. 9 is an end elevational view of the element shown in FIG. 8;

FIG. 10 is a perspective view of a tandem frame assembly generally similar to that of FIG. 1, with base shelves assembled therewith;

FIG. 11 is an exploded perspective view of the end frame elements shown in FIGS. 1 and 10, in combination with a promotional frame;

FIG. 12 is a fragmentary perspective view of the upper end portion of the frame shown in FIG. 10, viewed from the opposite side from that of FIG. 10;

FIG. 13 is a fragmentary perspective view of a corner portion of a shelf in relation to the adjacent frame portions, as seen in FIG. 10, showing the manner of attachment thereof;

Figure 32:
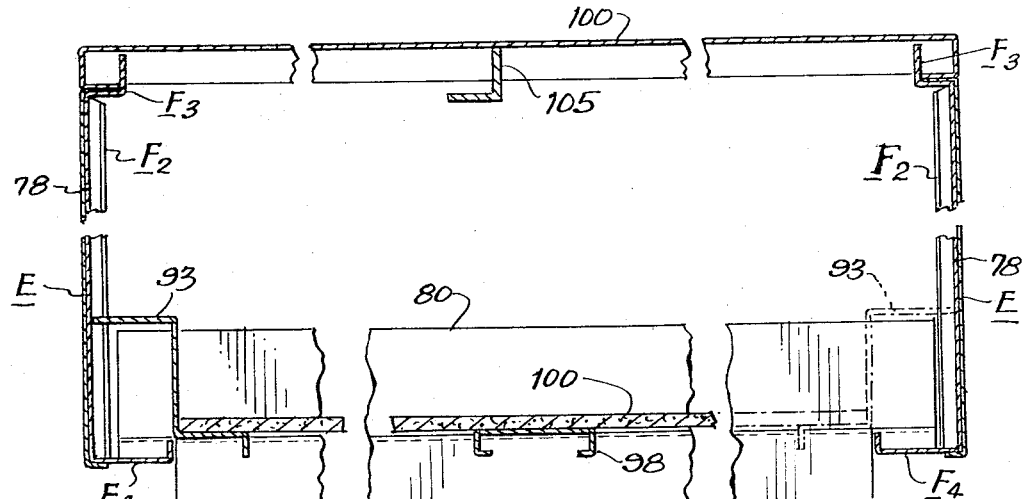
Figure 43:
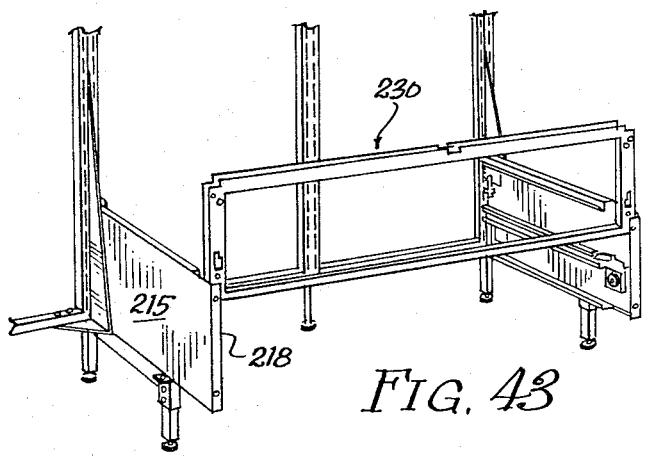
Figure 44:
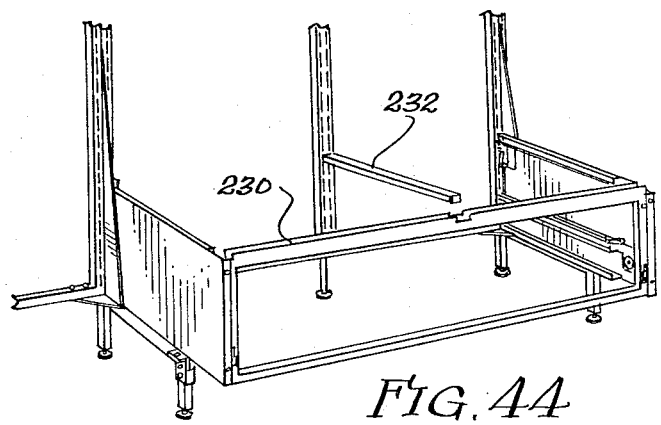
Figure 45:
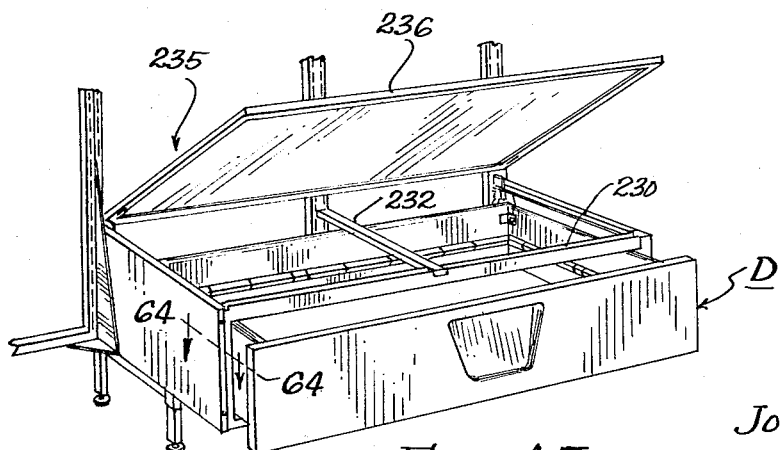

FIGS. 22–29, inclusive, are fragmentary perspective views illustrating successive steps in the assembly of a "drop-front" cabinet constituting one embodiment of my invention;

FIG. 30 is a fragmentary vertical front-to-rear sectional view partly in elevation, of a completed storage unit and supporting frame as seen in FIG. 1;

FIG. 31 is a fragmentary plan-section of the parts shown in FIG. 30;

FIG. 32 is a fragmentary sectional view taken substantially along the line 32—32 of FIG. 30;

FIGS. 33–38, inclusive, are fragmentary perspective views illustrating successive steps in the assembly of another embodiment of my invention, a double "drop-front" unit including an "add-on" shelf;

FIG. 39 is a perspective view of a tandem frame structure embodying a modified form of my invention;

FIG. 40 is a perspective view on an enlarged scale showing the first stage in assembling a cabinet or housing for my improved knock-down drawer on the frame of FIG. 39;

FIGS. 41 and 42 are perspective views of accessory brackets employed in connection with this embodiment of my invention;

FIGS. 43 and 44 are perspective views showing further stages in the assembly of the same cabinet;

FIG. 45 is a perspective view showing a later stage in said assembly, with a drawer partially inserted in the cabinet and a cover or shelf being assembled therewith.

FIG. 46 is a perspective view of a front panel of my improved konck-down drawer;

FIG. 47 is a perspective view of the front panel and bottom assembled therewith.

Figure 65:
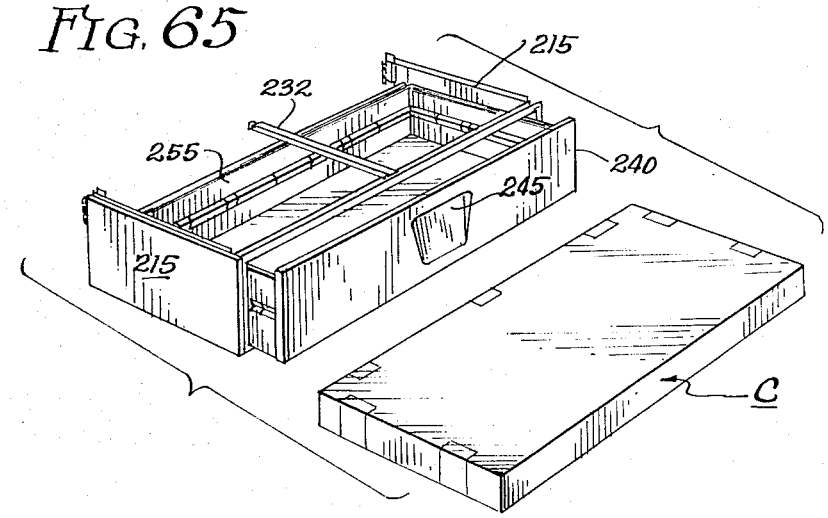
Figure 66:
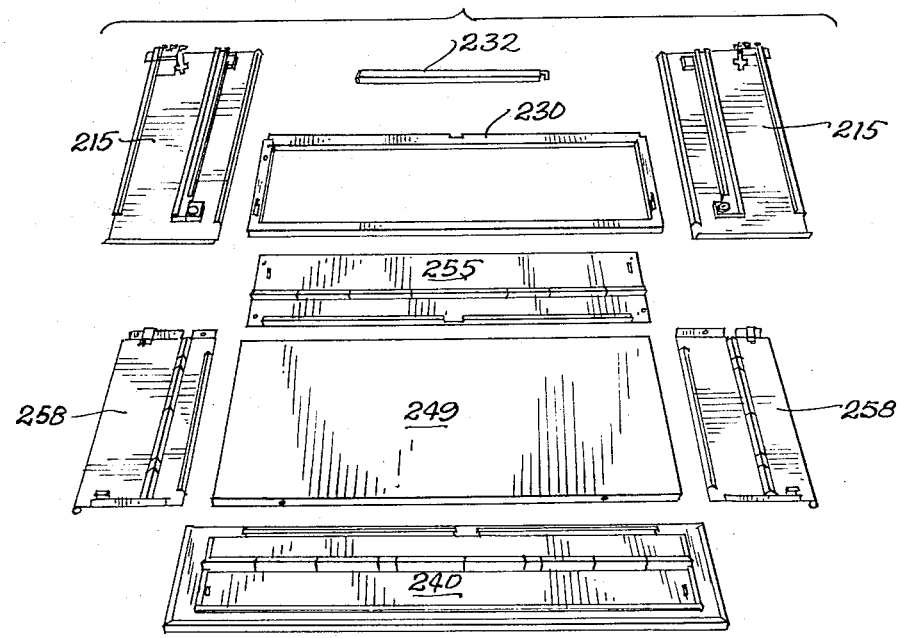

FIG. 48 is sectional view on an enlarged scale, taken substantially along line 48—48 of FIG. 47;

FIG. 49 is a perspective of the drawer bottom, front and back panels assembled together;

FIG. 50 is a perspective view of the same with a side panel partially assembled therewith;

FIG. 51 is a perspective view on an enlarged scale of a clamp member employed in said knock-down drawer;

FIG. 52 is a perspective view of said drawer completely assembled;

FIG. 53 is a side elevational view of said drawer;

FIG. 54 is a fragmentary sectional view of a drawer corner, taken substantially along line 54—54 of FIG. 53;

FIG. 55 is a fragmentary sectional view taken substantially along line 55—55 of FIG. 53;

FIG. 56 is a fragmentary sectional view taken substantially along line 56—56 of FIG. 53;

FIG. 57 is a fragmentary elevational view of a corner of the drawer on an enlarged scale, taken substantially along a plane represented by line 57—57 of FIG. 53;

FIG. 58 is a vertical sectional view taken through the drawer housing, with a drawer disposed therein;

FIG. 59 is a side elevational view of a side panel of the drawer housing seen in FIG. 40;

FIG. 60 is a detailed elevational view of a roller-guide track before its assembly with the side panel of the FIG. 61 is a fragmentary detailed section on an enlarged scale taken substantially along line 61—61 of FIG. 58;

FIG. 62 is a fragmentary sectional view taken substantially long line 62—62 of FIG. 58;

FIG. 63 is a fragmentary sectional view taken substantially along line 63—63 of FIG. 58;

FIG. 64 is a fragmentary horizontal sectional view through the housing and drawer taken substantially along line 64—64 of FIG. 45;

FIG. 65 shows in perspective my improved knock-down drawer partially assembled with the housing, and a carton for same when the drawer is knocked down for shipment;

FIG. 66 is a perspective view showing all of the drawer parts before assembly and packing thereof for shipment in the package seen in FIG. 65;

FIG. 67 is a perspective view, showing part of the same skeleton frame seen in FIG. 39, together with a pair of cabinets for drawers or the like;

FIG. 68 is a perspective view showing an improved merchandise bin assembled in the same housing;

FIG. 69 is a front perspective view of the bin shown in FIG. 68 and

FIG. 70 is a rear perspective view of said bin.

My invention contemplates the use of a skeleton frame based primarily on uprights usually formed of steel and provided with closely spaced elongated slots for the reception of bayonet-type hook elements for the support of various kinds of shelving, brackets, etc., etc. Representative types of such slotted uprights are shown in FIGS. 2–5, inclusive, and will be seen to be generally rectangular in cross-section. Thus, in FIGS. 2 and 4 are shown uprights 10 slotted on opposite walls as at 11.

A different form of upright 10a, as shown in FIGS. 3 and 5, including a double row of slots 11 on opposite flanges 12—12 of this post, is especially designed not only for the support of adjacent units but also on opposite sides of the main frame in what is referred to herein as tandem arrangement, as seen in FIG. 1.

Posts 10 will normally rest on the floor, with or without casters, and the latter may be threadedly arranged for levelling purposes. My preferred supporting structure includes an outrigger 15 for each post, and preferably a pair of oppositely extending outriggers in the tandem arrangement shown in FIG. 1. These outriggers, which may be permanently secured to a post 10 as by welding, or detachably connected thereto by means of bayonet hooks engageable in the slots, are preferably of square tubular form with a terminal foot portion 16 which may, if desired, be provided with a caster.

The posts 10 are connected to each other by any suitable means such as top stretcher bars 18, as seen in detail in FIGS. 6 and 7. The bar 18 in this instance is adapted to join a group of three posts 10. Said stretcher bar is preferably of square tubular section and provided with terminal notches 19 and intermediate notches 20 whereby the bar may be seated in recesses 22 (FIGS. 2 and 3) cut in the top of the posts. By this arrangement a rigid tie is provided for adjacent posts.

At or near the lower extremities of the posts 10 connecting beams 23 (FIGS. 8 and 9) are provided. These beams, as shown, are designed especially for use on tandem units as seen in FIG. 1; by obvious modification, substantially similar elements may be used on wall units. Beams 23, in the form shown, comprise a pair of plates 25, 25, joined together in parallel relation by suitable bridging elements 26, 27, preferably welded thereto, while a channel 29 having a longitudinal groove 30 therein is mounted on the top of beam 23. Bayonet hooks 32 at the ends of the beam are engageable in slots of a post. Swivelled or slideable locking dogs 35 are provided at opposite ends of the respective plates 25, 25, these dogs 35 being engageable in the slots engaging hooks 32, which slots may be somewhat oversize, for wedging beam 23 in position and thus effecting a rigid support at or near the base of the posts.

In the construction shown in FIG. 1, I provide not only a tandem arrangement for opposite disposed storage or display devices but also, as seen at the left of FIG. 1, a transversely disposed storage and display arrangement at the end of the tandem framing. As seen in FIGS. 10 and 11, outriggers 15' are attached to the end of outriggers 15, as by means of screws, etc. Resting on outriggers 15' is a transversely extending inwardly grooved frame 38 which may support one or more panels for the display of any desired promotional material in the natrue of posters, etc. Said promotional material may be in the form of cardboard, plywood, etc., mounted within the frame or frames 38. Mounted above frame 38, if desired, is an upstanding frame 38' (FIG. 10). The frames 38, 38' may conveniently be formed of individual sections of tubular or other material screwed or otherwise secured together. If desired, the vertical posts of said frames may be slotted for attachment of hook-supported cantilever brackets, etc., whereby shelving or other units may be hung on the frame.

Referring to FIG. 12, means is provided for imparting rigidity to the structure just described comprising a bracket 42 of L-shaped section having a pair of spaced ears 45 which extend into notches formed in the top of post 10 and are apertured to receive screws for attaching said bracket to the post. The vertical flange of bracket 42 is provided with spaced slots 43 to receive screws for attachment of cross-bar 18'.

Figure 14:
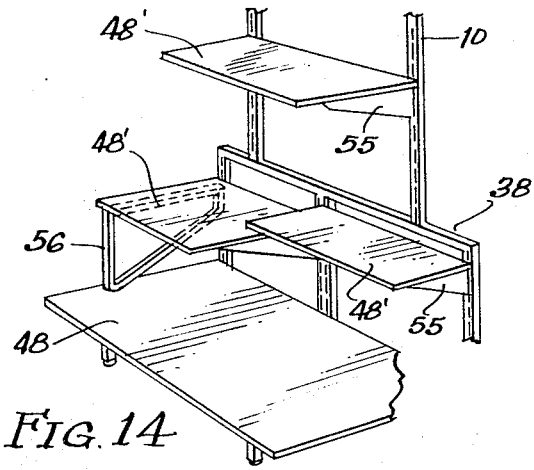
FIG. 14 is a fragmentary perspective view showing a modified arrangement of display shelving.

As seen in FIG. 14, shelves 48 may be provided to rest on the outrigger for support of merchandise in conjunction with the end frames and also, if desired, at any point along the main skeleton frame, said shelves being formed of plywood, sheet metal or other suitable material. Such shelves 48 may be of any desired dimensions and, if desired, may extend beyond the outriggers, and be secured thereto by means of latches or the like provided on the outrigger arms and secured to the shelving through slots 49 formed therein (FIG. 13), said latch members being manipulated by a suitable tool, such as a screwdriver.

Figure 15:
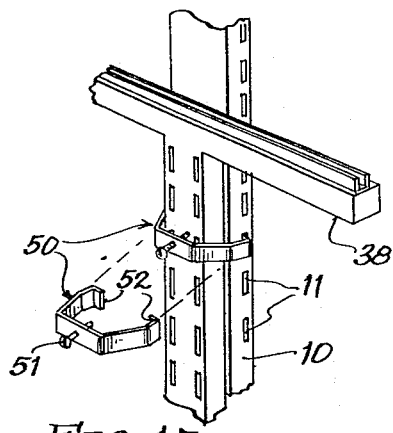
FIG. 15 is a fragmentary perspective detail showing means for attaching frame elements for mounting promotional displays.

When a display frame such as 38 (FIG. 11) is to be mounted at the end of a skeleton frame, it may be conveniently attached thereto as by means of a spring clip 50 (FIG. 15) which will embrace the vertical post of frame 38, being secured as by a set screw 51 and having inwardly extending fingers 52 which may be sprung into a pair of opposed slots 11 in post 10. By using a plurality of such spring clips 50 spaced along the adjacent post, a sufficiently rigid structure may be obtained.

FIG. 14 shows an example of end framing employed for the display of mechandise, etc., on shelving in conjunction with promotional panels bearing literal or illustrative matter.

Thus, cantilever brackets 55 having bayonet hooks may be engaged in any of the slots of the vertical posts for the support of shelving 48' or the like. Obviously, said brackets 55 may be disposed at any desired height for the support either of a single shelf extending entirely across frame 38', if desired, or a pair of shelves at different heights may be disposed in adjacent panels of frame 38. If desired, to support heavy merchandise disposed on shelf 48', in lieu of cantilever support 55, one may employ a more rugged leg or bracket 56 or the like, also attachable to a post by like means, and formed of a channel or the like.

Figure 16:
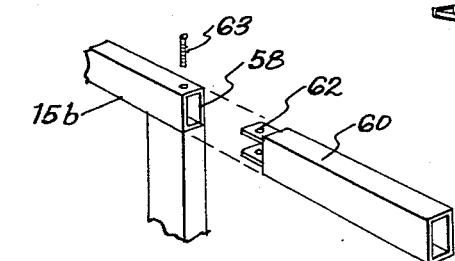
FIG. 16 is a fragmentary perspective detail illustrating means for elongating an outrigger beam.
Figure 17:
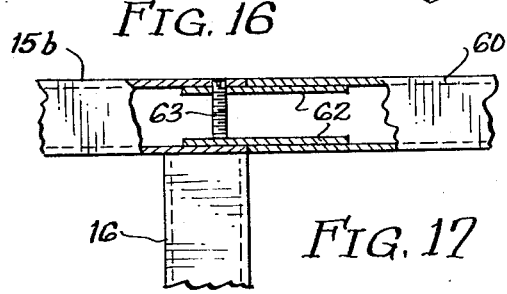
FIG. 17 is a fragmentary longitudinal vertical section, partly in elevation, of the parts shown in FIG. 16.

Referring to FIGS. 16 and 17, means is provided for extending the length of the outriggers if desired. Thus, the arms of outriggers 15b may be left open at their outer exteremity, as at 58, and an extension arm 60 of similar configuration is provided with a pair of parallel ears 62 which extend into the end of the outrigger arm and are secured thereto as by screw 63, whereby arm 60 will become an extension unitary with the outrigger.

Figure 18:
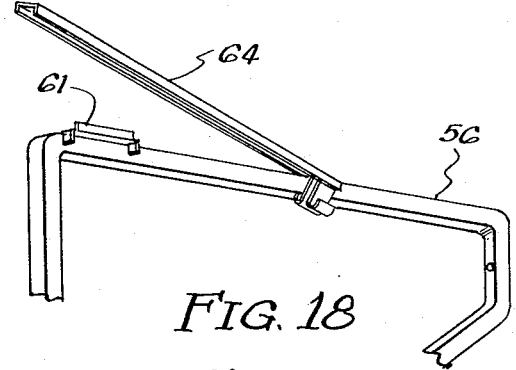
FIGS. 18 and 19 are perspective views illustrating means for elongating a shelf-supporting bracket.
Figure 19:
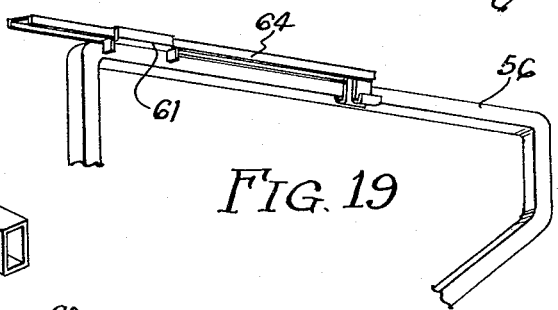

Referring to FIGS. 18 and 19, means is provided for extending the length of shelf-supporting legs 56, in order to accommodate shelving extending beyond the extremities thereof. To this end, a clip 61 may be attached to the forward extremity of the top bar of bracket 56, by welding, screws, etc., said clip having an upstanding flange engageable with an extension bar 64 which may be of channel formation, the inner extremity of said bar 64 having secured thereto a pair of oppositely disposed J-shaped hooks engageable with said top bar. The J-shaped hook member is doubled in reverse, as seen in FIGS. 18 and 19, in order that the extension bar 64 may be used as either a right-or-left-hand element.

It will be understood that post 10, stretcher bars 18 and beams 23 are all provided with channels or grooves for the reception of wall or panel members P (FIGS. 21–23) which may be for decorative or promotional purposes. These panels may be formed of any suitable material such as sheet metal, plywood, composition board, etc.

Figure 20:
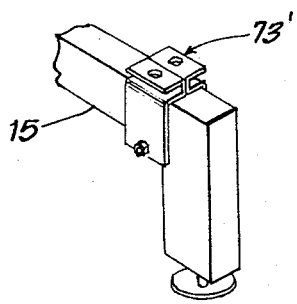
FIG. 20 is a fragmentary perspective view showing an outer extremity of an outrigger in connection with a double shelf-supporting clip.
Figure 21:
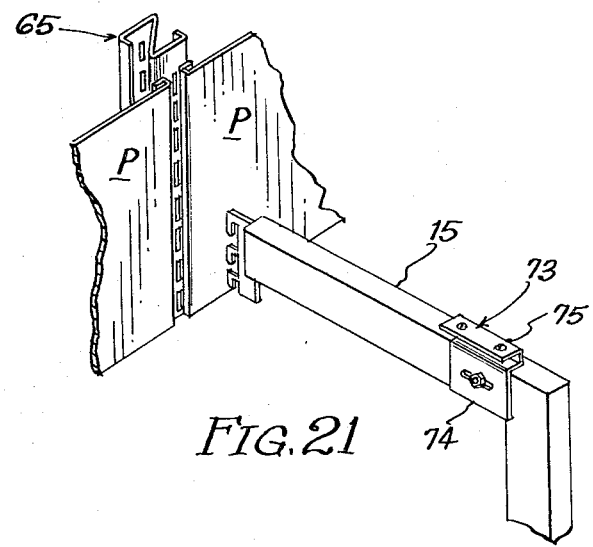
FIG. 21 is a fragmentary perspective view of an outrigger in association with other frame elements together with a single shelf-supporting clip.
Figure 22:
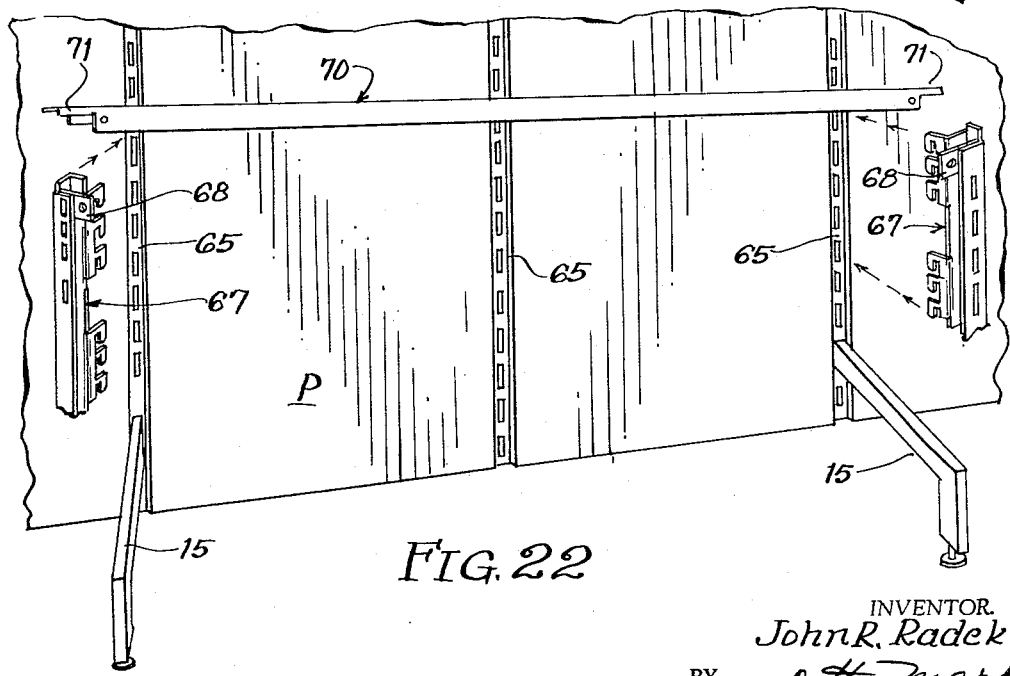

Referring to FIGS. 20–22, inclusive, an alternative frame structure is shown here wherein the vertical posts are in the form of Z-bars 65 the opposed flanges of which may be slotted for the reception of hooks, thus providing reversibility of the post. With this type of post I employ a wall adapter member 67 (FIG. 22) of generally channel formation and provided with hooks projecting from one flange thereof for engagement in the slots of post 65. Said adapters may have ears 68 projecting therefrom pierced to receive screws cooperating with apertures in the ends of a modified form of stretcher bar 70. This bar, like stretcher bars 18, is of generally channel formation but with the end portions 71 thereof modified to be adapted to seat on the Z-shaped posts 65. It will be understood that when panel members P are seated in the various grooves referred to and the hooks of outriggers 15 are engaged in the post and the adapters 67 are tightened up by screws passing through ears 68, panels P will be secured in position as seen in FIG. 22.

Regardless of whether or not panels P are employed, it is desired that clip members of the character seen in FIGS. 20 and 21 be attached near the outer ends of the outriggers 15, where a storage unit as hereinafter described is to rest on the outriggers. Clip 73 (FIG. 21) is employed on those of the outriggers which are disposed at or near the lateral extremities of a storage unit resting thereon, and these clips will be referred to as single clips; clips 73' (FIG. 20) are designed to be disposed on an outrigger intermediate the ends of a storage unit and will be referred to as double clips, inasmuch as clips 73' are essentially a pair of clips 73 secured together as by welding, brazing or the like. A clip 73 comprises a vertical flange 74 apertured for reception of a screw securing the clip to the arm of an outrigger, and an integral laterally projecting channel portion 75 also apertured for reception of one or more screws. It will be understood that the principal function of clips 73 and 73' is to support a storage unit in spaced relation above outriggers 15.

Figure 23:
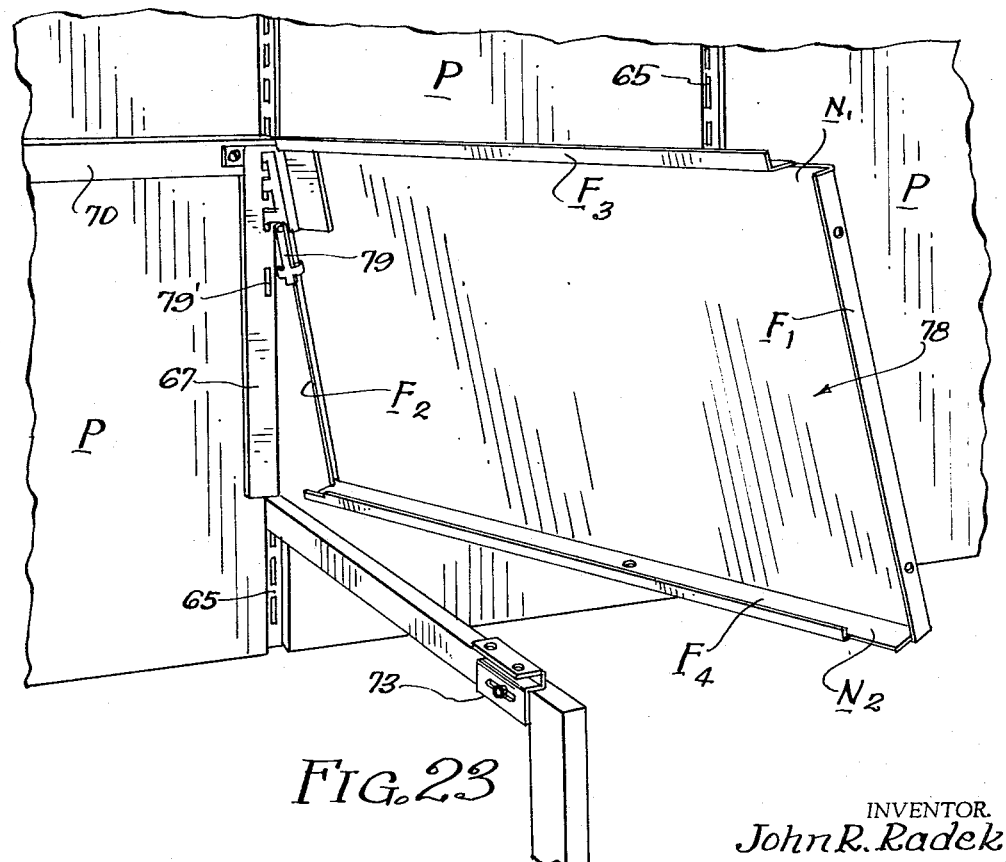
Figure 28:
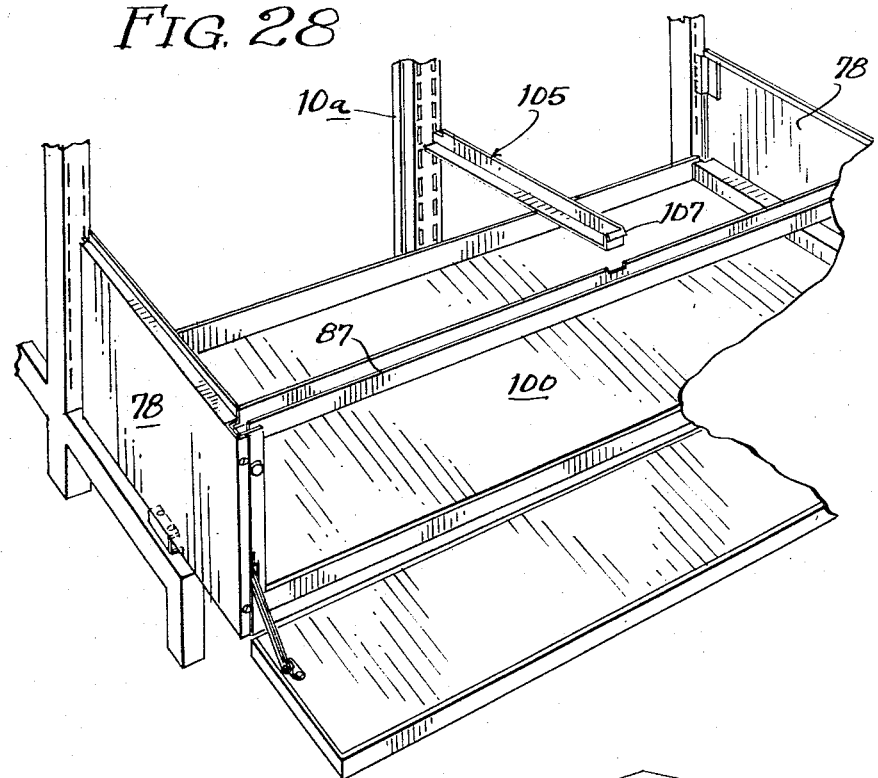

In the assembly of a storage unit on the frame in accordance with my invention, after the frame has been erected as heretofore described, the first step will be, as seen in FIG. 23, the hanging of a side panel 78 on the frame. This panel has flanges $F_1$, $F_2$, $F_3$, and $F_4$ and a bayonet hook portion secured as by welding or brazing to a rear corner thereof for engagement in slots of adapter plate 67 which in turn is attached to post 65; a pivoted latch member 79 engages in a slot 79' of the adapter, and a screw extending through an aperture in lower flange $F_4$ and engaging in the channel portion of clip 73 fixes the panel 78 firmly in position. A similar panel in reverse is mounted on the apposite side of a storage unit which is to be erected (FIGS. 27, 28).

Figure 24:
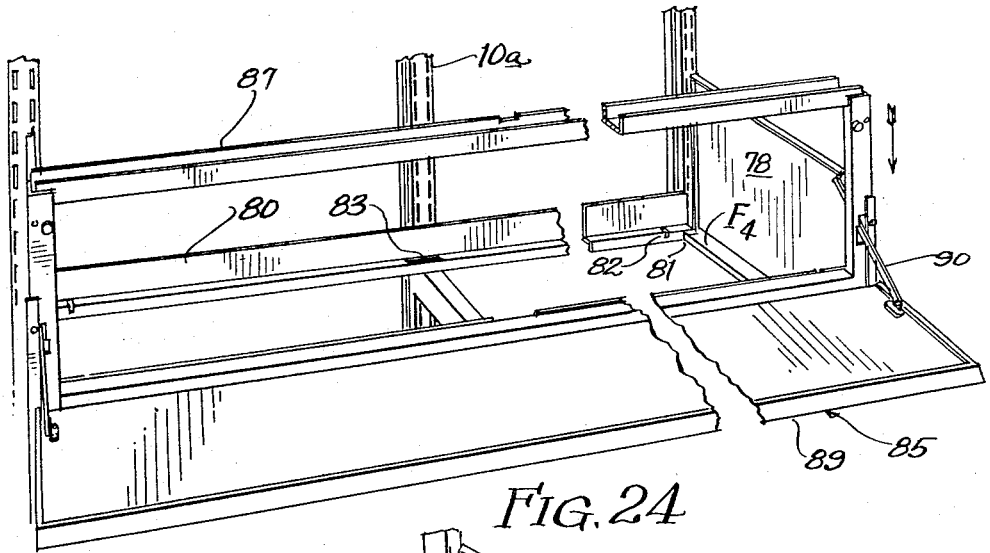

Referring now to FIG. 24, it should be understood that the assembly operation about to be described will be substantially the same, regardless of which of the various types of frame elements heretofore described is being used and regardless of whether or not a wall panel P is employed. Hence, it should be understood that in the illustrations showing the assembly of this particular storage unit or other storage or display units which might be substituted therefor, the associated framing and panelling may have a wide degree of flexibility within the purview of my invention.

Referring now to FIGS. 24 et seq., I show the use of posts 10a and no wall panelling such as panels P. In the assembly of storage units hereinafter to be described, after erection of side panels 78 substantially as above described, there is mounted on the framing comprising the vertical posts and outriggers a bottom back stretcher 80 which is generally of double L- or Z-formation, with a horizontal flange, an upstanding rear flange a downwardly extending vertical flange front.

It will be noted that at each end of stretcher 80 notches 81 are provided in the downwardly extending front flange of the stretcher to receive the terminal upstanding portion of flange F4 of side panel 78. Adjacent notch 81 on each side of the stretcher is another notch 82 for a purpose soon to be described. Another notch 83 midway of the length thereof is provided in the horizontal flange of stretcher 80.

The next step in the assembly operation is the mounting of a unit which I refer to as a drop-front assembly, indicated generally by the numeral 85. This unit 85 comprises a frame portion 87 and a door portion 89. It will be noted that frame portion 87 is formed by securing together four generally channel or angle shaped members preferably spot welded together at their ends with a flange of each side facing inwardly of the rectangle defined by said frame. Said frame extends into and is retained in vertical position by means of the notches N1 and N2 formed at the forward portion of top and bottom flanges F3 and F4, respectively, of said panels 78 (FIG. 23), said frame also being retained by front flange F1 of the side panels.

The door 89 is pivotally carried by frame 87 and is provided with spring-biased links 90, whereby the door is yieldably retained in closed position and is provided with suitable stops limiting its downward pivotal movement substantially to a horizontal position as seen in FIGS. 21–29. The hinge mechanism may conveniently be of a type such as is usually found on oven doors of kitchen ranges. The assembly 85 may be secured in position by means of screws S extending through the side members of frame 87 and also through flange F1 of the side panels 78.

Figure 25:
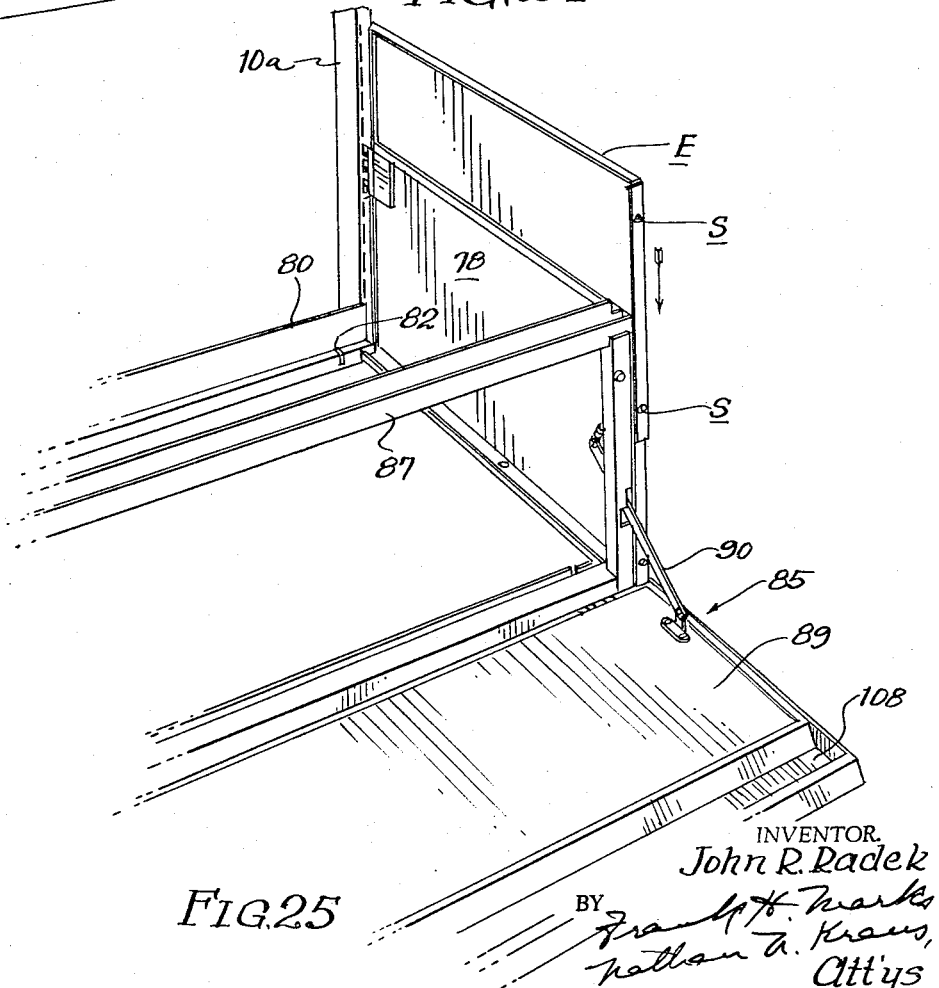

After the drop front assembly has been mounted in position as seen in FIGS. 24 and 25 finishing end panels or covers E which may be of sheet metal or of a suitable thermoplastic resin are mounted over the side panels 78, as seen in FIG. 25. End panels E are provided with inwardly extending flanges on all four sides thereof, making for a neat and attractive appearance, and may be slid into position as seen in FIG. 25 and then secured in place by screws extending through the apertures seen on the front flange of said panel.

In the next step of the assembly operation, one places in position side bottom stretchers 93 as seen in FIG. 26. These stretchers 93 are generally of a double L-formation with oppositely extending horizontal flanges at the top and bottom thereof and a terminal downwardly extending flange, the latter extending into notch 82 at the bottom back stretcher 80 while the front portion of side stretcher 93 extends into a notch 95 formed on the back of frame 87 of the drop front assembly 85.

Next, there is positioned a center bottom stretcher 98 (FIG. 26), preferably in the form of a shallow channel. Stretcher 98 has a downwardly extending flange at the rear thereof (not shown) which seats in notch 83 of back bottom stretcher 80, while a similar downwardly extending flange at the front of said stretcher 98 extends over a flange of frame 87 and is positioned within a notch formed therein, as seen in FIG. 26.

Sheet or panel 100 (FIG. 27) formed of any suitable material, such as plywood, "Masonite" or any other relatively stiff sheet material, is then slid into position to rest upon the side and middle stretcher bars heretofore described, to serve as a bottom for a storage compartment constituted by the parts heretofore described.

Next, as seen in FIG. 28, a center top stretcher bar 105 is placed in position. Bar 105 may be of any suitable shape, such as that of an angle, channel, etc. For attachment to a post it may have an outwardly projecting hook at the rear extremity thereof (not shown) which extends into one of the slots of posts 10a and a forwardly and downwardly extending flange 107 at the front extremity thereof seating in a notch at the top of frame 87.

A finishing door panel 108 having flanges around the two sides and top thereof, is slid onto door member 89 (FIG. 25) to provide an attractive finish for the door. Said front panel or cover plate 108 may be formed of any suitable material such as sheet metal or a thermoplastic resin.

Figure 29:
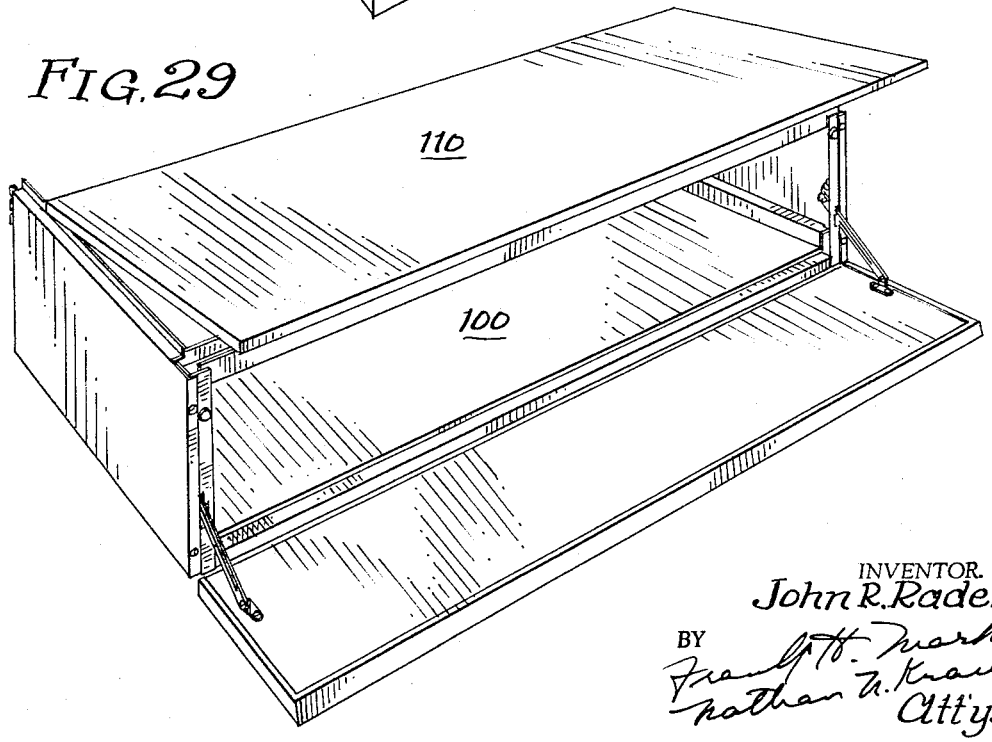

The storage compartment is completed with the addition of a top panel 110 (FIG. 29). This member 110 may be of sheet metal or other suitable material and provided with side and front downwardly extending flanges whereby it is seated in position on the adjacent members, as seen best in FIGS. 29–32, inclusive.

FIGS. 33–38, inclusive, show various other arrangements possible with my invention and illustrating the high degree of flexibility thereof. All of these arrangements comprise a variety of storage units which may be supported on a basic skeleton framing as previously described.

Figure 33:
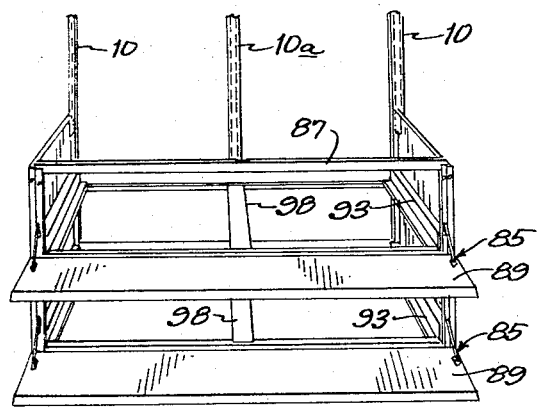
Figure 34:
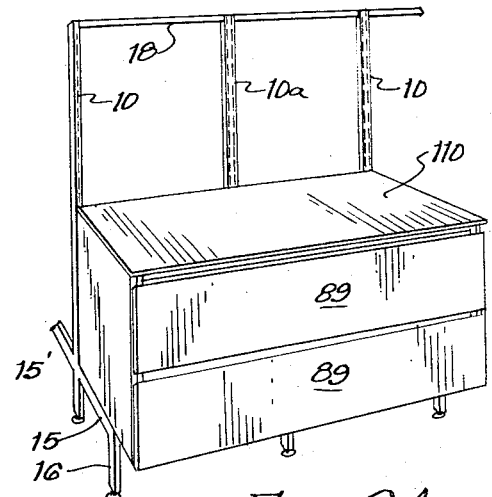

Thus, FIGS. 33 and 34 show a two-tier storage unit which is constructed in essentially the same way as the storage unit described above except for the proportioning of certain parts which will be readily apparent, being substantially identical to the structural elements. FIGS. 35–38, inclusive, show in detail the steps in assemblying another type of storage unit which I refer to as an "add-on shelf unit." This structure will be essentially similar to the drop-front storage unit described above except for the provision of structural elements for the support of added shelving.

Figure 35:
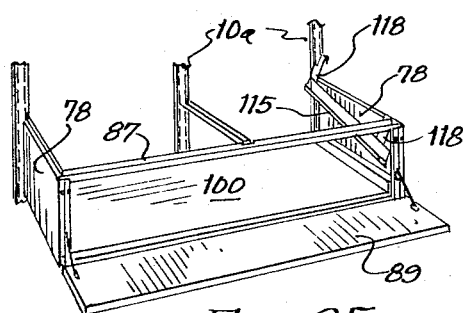
Figure 36:
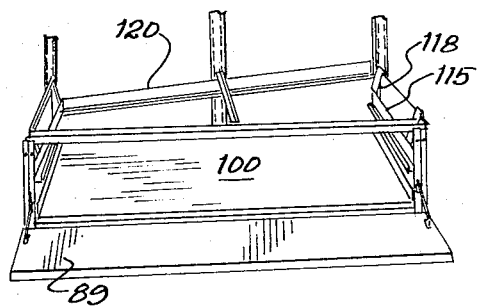
Figure 37:
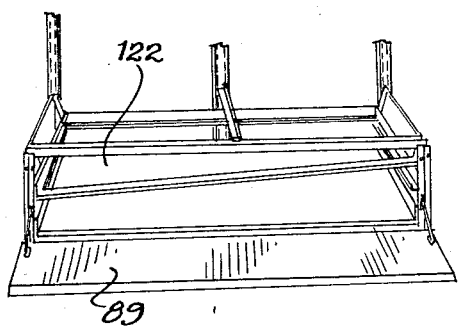
Figure 38:
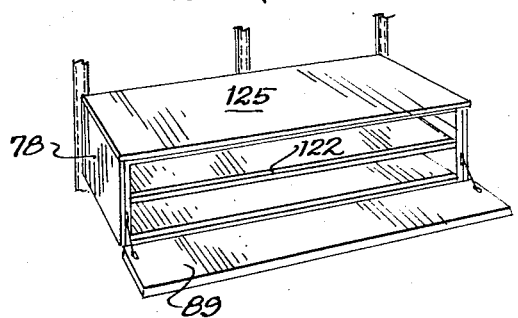

As seen in FIG. 35, in order to provide a multi-shelf storage unit, after assembly of a drop-front cabinet as described above, there are assembled therewith a pair of hanger members 115 provided with a strap or hook 118 at each end thereof, whereby the hanger is supported from the top edge of the side panels. Side hangers have an inwardly extending flange for the support of a shelf. After said hangers 115 have been positioned there is positioned a back stretcher 120, which may be of angular formation, and arranged to be supported on side hangers 115. Thereafter, one slides into position on said back stretcher 120 and side hangers 115 an intermediate shelf panel 122 (FIG. 37) and cover panel 125 will then be added as in the previously described embodiment.

Referring now to FIG. 39, I show here in perspective a tandem skeleton frame generally similar to that shown in FIG. 1, with certain modifications. Thus, the skeleton frame indicated generally by numeral 200 is formed of a plurality of slotted uprights 202, top stretcher bars 205 and bottom stretchers 207 which may, if desired, be generally similar to the corresponding elements of the previously described embodiment and are preferably designed for quick assembly and dis-assembly. Also, as in the other embodiment, I preferably provide a plurality of spaced outriggers 210 which, in the embodiment of FIG. 39, extend in opposite directions from the main skeleton frame for disposition away from a wall for tandem arrangement, while, if desired, one set of outriggers may be omitted and the frame disposed closely adjacent a wall.

In this embodiment I find it desirable to employ a plurality of triangular reinforcing gussets G formed of sheet metal or the like adjacent the outriggers, lying, respectively, in vertical and horizontal planes at the corners where the drawers are to be disposed, as hereinafter described.

Brackets 212 and 213 (FIGS. 41 and 42) are attached to the outriggers adjacent the outer extremities thereof, which may take the form of single (FIG. 41) or double (FIG. 42) brackets, depending on whether a pair of drawers are to be arranged in the fame adjacent each other or a single isolated drawer. The precise mechanical construction of these brackets is not of prime importance; in either case, I provide means for embracing the outer extremity of the outrigger together with one horizontal flange (FIG. 41) or a pair of oppositely extending flanges (FIG. 42). These brackets may be attached to the outriggers by screws or other suitable means.

My invention contemplates mounting on the skeleton frame, for housing a knock-down drawer as hereinafter described, a pair of side panels 215, one of which is seen in FIG. 40 in process of being mounted on the frame. This panel, like most of the other parts employed in connection with my invention, is preferably formed of sheet metal, preferably having a baked enamel finish.

A pair of allochiral side panels indicated generally by the numeral 215 are supported on the frame, as will be hereinafter explained and extend forwardly and substantially at right angles to the plane of the main frame. Each panel 215 may be formed of sheet metal with a baked enamel finish and includes a bottom flange 220 having an upturned lip, the flange being suitably pierced to receive screws which pass through the supporting brackets 212 or 213 as the case may be. Projecting rearwardly from the panel 215 is a plurality of hook elements 221 arranged to engage in corresponding slots in the upright members 202 of the frame. A pivoted latch member 223 mounted on the panel cooperates with one of the slots in the upright member 202 to lock the panel in assembled position.

Panel 215 is provided with a top flange 217 which terminates in a V-formation for purposes of stiffening. A pair of spaced channel elements 215a and 215b welded to the inner wall surface of the panel 215 afford support for the track guide 225.

As will be seen in FIG. 63, the track glide is comprised of a pair of cooperating elements 225a and 225b shaped substantially as illustrated and secured to the channel element 215b as by a screw. On top of the forward channel element 215a there is welded an abutment 265 and arranged to overlie the latter is an inverted generally L-shaped bracket 266 on the horizontal leg of which is supported guide track sections 225a and b.

The vertical leg of bracket 266 is provided with an elongated slot and is disposed in parallel relation to the vertical wall of the channel 215a, there being interposed between the vertical leg and the channel a washer 267. A bolt 268 passes through the slot and the lock washer and engages a threaded aperture in the vertical wall of channel member 215a.

A leveling screw 269 passes through the flanges of the track guide and is in threaded engagement with an aperture in bracket 266 so that, as the screw is rotated in one direction or another, adjustment of the track guide vertically in relation to the rectangular frame 230 is effected. Once an adjustment has been made the wing nut 271 cooperating with the leveling screw is tightened, as is also screw 268, thereby securing guide track 225 in a position of adjustment.

The forward end of the guide track is cut away to afford clearance for a spring-biased releasable stop latch 228 which normally is urged in a direction as illustrated in FIG. 64 to enter into the space of the guide track 225 and afford a stop for roller 272 mounted on the drawer, as hereinafter explained.

A roller 227 is mounted on channel element 215a as illustrated in FIG. 40.

As noted above, side panels 215 are arranged in opposed complementary relation so as to provide cooperating track guides 225 for a drawer unit hereinafter described.

The rearward end of each panel 215 is provided with a projecting tang 273 in coplanar relationship with the hook elements, the tang being adapted to be received in one of the slots of a post 202.

Referring specifically to FIG. 60, it will be seen that the lower section 225b of guide track 225 is formed in two angularly related portions with the rearward portion inclined downwardly in relation to the forward portion which is horizontal, for a purpose hereinafter explained.

The knock-down drawer illustrated in assembled condition in FIG. 52 and disassembled in FIG. 66, comprises a plurality of panels adapted to be assembled as presently described. At bottom panel 249 includes perimetric flanges 274 having inwardly turned terminal portions. A front panel 240 (FIG. 58) formed of sheet metal or like material comprises a rectangular member 258a having top and side outwardly directed marginal flanges 258b in acute angular relationship to the plane of member 258a. A flange 276 disposed substantially at a right angle to the plane of member 258a is provided at the bottom thereof. Welded to the inner side of member 258a is another sheet metal member 258b of smaller area having a longitudinally extending V-shaped stiffening rib 267 intermediate the longitudinal edges thereof. This rib is provided with a plurality of spaced slots 278 for a purpose hereinafter explained. The upper edge of member 258a is formed into a bead 279 substantially circular in cross-section while the lower edge of said member is provided with an inwardly directed flange 280 terminating in a lip 281 disposed at an acute angle in relation to the plane of flange 280. An outer cover member 242 is provided with top and side flanges 243 so arranged that it may be slid into engagement with member 258a and retained in assembled relation therewith by a screw 282 passing through the bottom flanges of the respective members. Cover member 242 may be provided with a stamped recess 245 as illustrated in FIGS. 46 and 58, to function as a hand grip, or other suitable handle means may be provided. A pair of slots 247 is provided in members 258a and 258b for a purpose hereinafter explained.

Rear panel 255 is substantially like member 258b, the panel having an intermediate V-shaped slotted rib 267a, a lower flange 255a and a bead 255b at the top. Flanges 255a and 280 interlock as illustrated in FIG. 58.

Side panels 258 of the drawer are allochiral, each including an intermediate V-shaped slotted rib 259, a top bead and a lower flange 263 arranged to interlock with flange 280 of the bottom panel. Panels 258 are provided with front and rear flanges 264 and 266, respectively, the front flanges being received in the space between the offset side marginal edges of member 258b, as illustrated in FIG. 52. The rearward flanges 266 overlap the edges of rear panel 255. As illustrated in FIG. 57 substantially L-shaped clamp members 260 having a hook portion 260a at the end of one leg and a right-angle tang 260b at the other afford means for securing the front rear and side panels in assembled relation. It will be observed that hook portion 260a is received in a slot of the front or rear panel with the tang 260b received in a corresponding slot of a side panel. A bolt 261 is passed through an aperture in the clamp member and a registering aperture in the panel and is secured as by a wing nut 265. A bracket 282 is welded to the outer surface of the side panel 258 and is provided with a pair of spaced laterally extending lugs 283 which afford stops for the drawer. A roller 272 is carried on the backet and is spaced laterally therefrom. A track 284 in the shape of an inverted L is suitably attached to the outer wall, as illustrated in FIGS. 55 and 56, the track being divided into two sections 284a and 284b, which one section angularly inclined upwardly relative to the other.

The opposed ribs 267, 267a and 259 are in horizontal registration and the respective slots 278 and 259a are arranged to receive opposite ends of divider panels to provide a plurality of compartments within the drawer.

The drawer is inserted between the side panels 215 with the rollers 272 being received in the guide track 225 and the rollers 227 engaging the under surface of the under surface of the track 284, as illustrated in FIG. 62. In inserting the drawer between the outer panels the rollers 272 are caused to displace the releasable stop 228 and to pass thereunder. However, immediately after passage of the roller the stop 228 assumes its locking position, as illustrated in FIG. 64, so as to prevent inadvertent removal of the drawer.

The relative arrangements of the track guides and rollers is such that, if the drawer is left in a partly closed or retracted position, the track guides cooperating with the roller will urge the drawer to fully retracted position. Thus, after a drawer has been pulled to extended position and the user removes the articles desired from within the drawer and then shoves the drawer to a closed position, complete closing of the drawer is assured at the point where the rollers 272 are disposed to the right of the juncture point 285 in the guide track 225 (FIG. 60) and the rollers 227 are disposed to the left of the juncture point 286 of the guide track 286 (FIG. 53). Of course, it will be understood that, when the drawer is drawn out to completely extended position, the rollers are engaged in their respective track guides which are in parallel relationship, so that the drawer will be caused to remain open when so desired.

We see laid out in FIG. 66 the various parts which make up the improved knock-down drawer described above together with parts of the cabinet for same, shown mounted on the skeleton frame in FIG. 45. (FIG. 65 shows all of said parts assembled (detached from the skeleton frame). Depicted in front of the assembly of FIG. 65 is shown, for comparison, a carton C in which all of said parts are packed for shipment.

It will be seen that among the highly important advantages of my invention is the facility with which this item may be assembled and knock-down, and also the extremely compact manner in which said parts may be packed for shipment, thus making it possible to ship same by parcel post or other convenient means of transportation.

FIG. 67 shows the convenience whereby a plurality of knock-down drawers, as described above, may be stacked on a frame in accordance with my invention. FIG. 67 shows a single drawer disposed in the cabinet with a second housing provided thereabove for another drawer. This arrangement might be finished off by disposing a panel above the uppermost housing to provide a table top or, if desired, additional drawers might be stacked thereabove up to the top of the frame.

FIGS. 68-70, inclusive, show, as a further illustration of the great versatility of my invention, an improved bin 300 which may be disposed on the same skeleton frame. It is intended that a bin of this character may be removably disposed within a housing carried by said frame. Bin 300 may be of any desired shape, conveniently comprising a front panel 305 with a handle 307 of any desired type, a back wall 310, also provided with a suitable handle 312, and side walls 315, 315, said side walls preferably having a downwardly and forwardly sloping top edge. A plurality of legs 318 (in this case three) are provided whereby the bin will be self-supporting outside the cabinet and may for convenience be pushed around the room.

A table top T may be arranged above the bin, as seen in FIG. 68.

Means is provided for mounting the bin removably within the cabinet, as seen dotted in FIG. 68, which means may be similar in character to that provided for the knock-down drawer described in detail hereabove. It will be readily understood, without need for repetition here, that such guide and support means may include a rail 320 and roller 322 on each of the side walls 315 of the bin.

In view of the depth of the bin being in excess of that of the knock-down drawer described above, I provide means for mounting the bin in the skeleton frame similar to that described above by disposing on the frame a pair of panels 330, 330, the inner faces of said panels being devoid of support means for a drawer or bin and arranging above said panels 330 a pair of side panels 330a which are substantially similar in most respects to side panels 215 described above, FIG. 40, for mounting the drawers. Said panels 330a will have on the inner face thereof guide means 325 substantially as described above for coacting with the roller and guide rail provided on the side walls 315 of the bin but will lack a safety catch as described above for locking the drawer within the housing.

Thus, it will be seen that a bin 300 may be used conveniently for storage of merchandise, etc., within the cabinet as seen in FIG. 68; however, said bin may readily be withdrawn from the housing and moved to any desired place for independent display of merchandise or for packing goods therein and movement back to the housing when desired.

While I have shown and described only a few embodiments of my invention, it will be readily understood that I have provided an extremely versatile arrangement of knock-down frame and accessories thereto for construction of a wide variety of display and storage facilities in a store or the like, all of which may be easily and quickly knocked down and erected as desired with a minimum of tools and with no particular mechanical skill.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. In knock-down merchandise display and storage equipment,
 (a) frame means comprising at least a pair of uprights and a stretcher connecting adjacent uprights,
 (b) a floor supported outrigger detachably connected to each of said uprights and extending transversely from the plane defined by said uprights,
 (c) a pair of housing panels, each detachably supported by a respective upright and outrigger and disposed vertically in spaced parallel relationship to each other,
 (d) a receptacle arranged to be received in the space between said panels, and
 (e) cooperating means carried on said panels and on said receptacle for supporting said receptacle for generally horizontal sliding movement in relation to said panels.

2. In knock-down merchandise display and storage equipment,
 (a) frame means comprising at least a pair of uprights and a stretcher connecting adjacent uprights,
 (b) a floor supported outrigger detachably connected to each of said uprights and extending transversely from the plane defined by said uprights,
 (c) a pair of panels, each detachably supported by a respective upright and outrigger and disposed vertically in spaced parallel relationship to each other,
 (d) each of said panels having a track guide on its inner side, and
 (e) a receptacle arranged to be received in the space between said panels,
 (f) said receptacle having supporting elements cooperating with said respective track guides and arranged for generally horizontal slideable support of said receptacle.

3. In knock-down mechandise display and storage equipment,
 (a) frame means comprising at least a pair of uprights and a stretcher connecting adjacent uprights,
 (b) a floor supported outrigger detachably connected to each of said uprights and extending transversely from the plane defined by said uprights,
 (c) a pair of panels, each detachably carried by a respective upright and outrigger and disposed vertically in spaced parallel relationship to each other,
 (d) each of said panels having a track guide on its inner side,
 (e) a receptacle arranged to be received in the space between said panels,
 (f) said receptacle having supporting elements cooperating with respective track guides and arranged for generally horizontal slideable support of said receptable, and
 (g) releasable abutment means disposed at the forward end of at least one of the track guides for limiting the movement of said receptacle relative to said panels.

4. In knock-down mechandise display and storage equipment,
 (a) frame means comprising at least a pair of uprights and a stretcher connecting adjacent uprights,
 (b) a floor supported outrigger detachably connected to each of said uprights and extending transversely from the plane defined by said uprights,
 (c) a pair of panels, each detachably carried by a respective upright and outrigger and disposed vertically in spaced parallel relationship to each other,
 (d) a receptacle arranged to be received in the space between said panels, (e) cooperating means carried on said panels and on said receptacle for supporting said receptacle for generally horizontal sliding movement in relation to said panels,
(f) said last mentioned means being so constructed and arranged as to effect automatically complete movement of the said receptacle to fully closed position when said receptacle is urged in a direction towards closed position.

5. In knock-down mechandise display and storage equipment,
 (a) frame means comprising at least a pair of uprights and a stretcher connecting adjacent uprights,
 (b) a floor supported outrigger detachably connected to each of said uprights and extending transversely from the plane defined by said uprights,
 (c) a pair of panels, each detachably carried by a respective upright and outrigger and disposed vertically in spaced parallel relationship to each other,
 (d) each of said panels having a first generally horizontal track guide on its inner side and a first roller disposed in close proximity to the forward end of said track guide,
 (e) a receptacle arranged to be received in the space between said outer panels,
 (f) said receptacle having a second generally horizontal track guide at each side and a second roller in close proximity to the rearward end of said second track guide, said first rollers cooperating with said second track guides and said second rollers cooperating with said first track guides to support said receptacle for generally horizontal sliding movement relative to said panels.

6. In knock-down mechandise display and storage equipment,
 (a) frame means comprising at least a pair of uprights and a stretcher connecting adjacent uprights,
 (b) a floor supported outrigger detachably connected to each of said uprights and extending transversely from the plane defined by said uprights,
 (c) a pair of panels, each detachably carried by a respective upright and outrigger and disposed vertically in spaced parallel relationship to each other,
 (d) each of said panels having a first generally horizontal track guide on its inner side and a first roller disposed in close proximity to the forward end of said track guide,
 (e) a receptacle arranged to be received in the space between said panels,
 (f) said receptacle having a second generally horizontal track guide at each side and a second roller in close proximity to the rearward end of said second track guide, said first rollers cooperating with said second track guides and said second rollers cooperating with said first track guides to support said receptacle for generally horizontal sliding movement relative to said panels,
 (g) said track guides and rollers being so constructed and arranged as to effect automatically complete movement of the said receptacle to fully closed position when said receptacle is urged in a direction towards closed position.

7. In knock-down merchandise display and storage equipment,
 (a) frame means comprising at least a pair of uprights and a stretcher connecting adjacent uprights,
 (b) a floor supported outrigger detachably connected to each of said uprights and extending transversely from the plane defined by said uprights,
 (c) a first pair of housing panels each detachably secured to a respective upright and outrigger and disposed vertically in spaced parallel relationship to each other,
 (d) a second pair of housing panels each stacked on a respective one of said first pair of outer panels and in coplanar relationship therewith,
 (e) a receptacle arranged to be received in the space between at least one of said pairs of panels, and
 (f) cooperating means carried on at least one pair of said panels and on said receptacle for supporting said receptacle for sliding movement relative to said outer panels.

8. A combination as in claim 7, wherein said receptacle has a depth substantially equal to a stacked pair of said panels.

9. A combination as in claim 7, wherein a separate receptacle is slideably disposed between each of said pairs of panels.

10. In knock-down merchandise display and storage equipment,
 (a) frame means comprising at least a pair of uprights and a stretcher connecting adjacent uprights,
 (b) a floor supported outrigger detachably connected to each of said uprights and extending transversely from the plane defined by said uprights,
 (c) a pair of panels, each carried by a respective upright and outrigger and disposed vertically in spaced parallel relationship to each other,
 (d) each of said panels having a track guide on its inner side,
 (e) a receptacle arranged to be received in the space between said panels, said receptacle being formed of a plurality of knock-down sheet-metal sections arranged to be interengaged and secured in assembled relation,
 (f) said receptacle having supporting elements cooperating with respective track guides and arranged for generally horizontal slideable support of said receptacle, and
 (g) releasable abutment means disposed at the forward end of at least one of the track guides for limiting the movement of said receptacle relative to said panels.

11. A combination as in claim 8, wherein said receptacle is of a bin type, provided with supporting means independent of said frame means and having casters attached thereto, said receptacle being bodily removable from said frame means.

References Cited by the Examiner

UNITED STATES PATENTS

| | | | |
|---|---|---|---|
| 2,108,516 | 2/1938 | Thompson | 312—107 |
| 2,328,835 | 9/1943 | Motter | 312—333 |
| 2,655,422 | 10/1953 | Gussack | 312—333 |
| 2,701,174 | 2/1955 | Franks | 312—263 |
| 2,843,441 | 7/1958 | Jewell | 312—333 X |
| 2,848,294 | 8/1958 | Sandberg | 312—348 X |
| 3,029,357 | 4/1962 | Williams | 312—263 |
| 3,130,693 | 4/1964 | Shell | 108—108 |
| 3,159,437 | 12/1964 | Jentzen | 312—108 |
| 3,200,961 | 8/1965 | Kolster | 211—148 |

FOREIGN PATENTS

| | | |
|---|---|---|
| 151,870 | 6/1953 | Australia. |
| 1,338,243 | 8/1963 | France. |

CLAUDE A. LE ROY, *Primary Examiner.*

CHANCELLOR E. HARRIS, *Examiner.*

A. FRANKEL, *Assistant Examiner.*